(12) United States Patent
Petrangeli et al.

(10) Patent No.: US 11,967,049 B2
(45) Date of Patent: Apr. 23, 2024

(54) TECHNIQUES FOR IMAGE ATTRIBUTE EDITING USING NEURAL NETWORKS

(71) Applicant: Adobe Inc., San Jose, CA (US)

(72) Inventors: Stefano Petrangeli, San Francisco, CA (US); Viswanathan Swaminathan, Saratoga, CA (US); Haoliang Wang, San Jose, CA (US); YoungJoong Kwon, San Jose, CA (US)

(73) Assignee: Adobe Inc., San Jose, CA (US)

( * ) Notice: Subject to any disclaimer, the term of this patent is extended or adjusted under 35 U.S.C. 154(b) by 335 days.

(21) Appl. No.: 17/531,640

(22) Filed: Nov. 19, 2021

(65) Prior Publication Data

US 2023/0162330 A1    May 25, 2023

(51) Int. Cl.
    G06T 5/00      (2006.01)
    G06N 3/045     (2023.01)
    G06V 10/75     (2022.01)

(52) U.S. Cl.
    CPC .......... G06T 5/005 (2013.01); G06N 3/045 (2023.01); G06V 10/7553 (2022.01)

(58) Field of Classification Search
    CPC .......... G06T 5/005; G06T 2207/20081; G06T 2207/20084; G06N 3/045; G06N 3/088; G06N 3/047; G06N 3/08; G06N 3/084; G06V 10/7553
    See application file for complete search history.

(56) References Cited

U.S. PATENT DOCUMENTS

| | | | |
|---|---|---|---|
| 2020/0151963 A1* | 5/2020 | Lee | G06T 7/149 |
| 2020/0335199 A1* | 10/2020 | Accomazzi | G06T 7/0002 |
| 2021/0142539 A1* | 5/2021 | Ayush | G06T 11/00 |
| 2022/0028139 A1* | 1/2022 | Mitra | G06V 40/175 |
| 2022/0067994 A1* | 3/2022 | Neuberger | G06T 11/001 |
| 2022/0114698 A1* | 4/2022 | Liu | G06T 7/11 |

(Continued)

OTHER PUBLICATIONS

Ak et al., "Attribute Manipulation Generative Adversarial Networks For Fashion Images" In Proceedings of the IEEE International Conference on Computer Vision, 2019, pp. 10541-1055.

(Continued)

*Primary Examiner* — Van D Huynh
(74) *Attorney, Agent, or Firm* — Kilpatrick Townsend & Stockton LLP

(57) ABSTRACT

The present disclosure describes multi-stage image editing techniques to improve detail and accuracy in edited images. An input image including a target region to be edited and an edit parameter specifying a modification to the target region are received. A parsing map of the input image is generated. A latent representation of the parsing map is generated. An edit is applied to the latent representation of the parsing map based on the edit parameter. The edited latent representation is input to a neural network to generate a modified parsing map including the target region with a shape change according to the edit parameter. Based on the input image and the modified parsing map, a masked image corresponding to the shape change is generated. Based on the masked image, a neural network is used to generate an edited image with the modification to the target region.

20 Claims, 10 Drawing Sheets

(4 of 10 Drawing Sheet(s) Filed in Color)

(56) References Cited

U.S. PATENT DOCUMENTS

2022/0309633 A1\* 9/2022 Davies ................ G06T 7/11
2023/0015117 A1\* 1/2023 Aberman ............. G06T 7/194

OTHER PUBLICATIONS

Arjovsky et al. "Wasserstein GAN" arXiv preprint arXiv:1701.07875, Dec. 6, 2017, 32 pages.
Goodfellow et al., "Generative Adversarial Nets", NIPS, arXiv:1406.2661v1, Jun. 10, 2014, 9 pages.
Gulrajani et al., "Improved Training Of Wasserstein GANs" In Advances in neural information processing systems, 2017, 11 pages.
He et al. "AttGAN: Facial Attribute Editing By Only Changing What You Want", IEEE Transactions on Image Processing, vol. 28, No. 11, 2019, pp. 5464-5478.
Liu et al. "STGAN: A Unified Selective Transfer Network For Arbitrary Image Attribute Editing", In Proceedings of the IEEE conference on computer vision and pattern recognition, 2019, pp. 3673-3682.
Pathak et al. "Context Encoders: Feature Learning by Inpainting", arXiv:1604.07379v2 [cs.CV], Nov. 21, 2016, 12 pages.
Ping et al. "Fashion-AttGAN: Attribute-Aware Fashion Editing With Multi-Objective GAN" In Proceedings of the IEEE Conference on Computer Vision and Pattern Recognition Workshops, 2019, pp. 4321-4323.
Yamaguchi et al. "Parsing Clothing in Fashion Photographs", 8 pages.
Yu et al. "Generative Image Inpainting With Contextual Attention", In Proceedings of the IEEE conference on computer vision and pattern recognition, pp. 5505-5514, 2018.
Yu et al. "Free-Form Image Inpainting With Gated Convolution", In Proceedings of the IEEE International Conference on Computer Vision, 2019, pp. 4471-4480.
Zhao et al. "Loss Functions for Image Restoration with Neural Networks" arXiv:1511.08861v3 [cs.CV], Apr. 20, 2018, 11 pages.
Zhu et al. "Be Your Own Prada: Fashion Synthesis With Structural Coherence" Proceedings of the IEEE international conference on computer vision, arXiv:1710.07346v1 [cs.CV], Oct. 19, 2017, pp. 1680-1688.

\* cited by examiner

TECHNIQUES FOR IMAGE ATTRIBUTE EDITING USING NEURAL NETWORKS

TECHNICAL FIELD

This disclosure generally relates to image editing techniques. More specifically, but not by way of limitation, this disclosure relates to techniques for image attribute editing using a multi-stage approach to improve detail and accuracy in edited images.

BACKGROUND

Many image editing tools provide features that enable a user to edit or modify attributes in an image. Some of these tools use machine learning-based techniques for editing images. However, the image editing capabilities of existing tools are quite limited. For example, the recreation of unedited parts of the image is not accurate, the editing is limited to low-resolution images (e.g., 256×256) (i.e., large high resolution images cannot be processed at all or cannot be processed in a reasonable time frame), unwanted artifacts and effects are introduced into the images, and other deficiencies.

The goal of many image editing tasks is to manipulate an image based on a user-specified attribute, while preserving the details of the original image as intact as possible. Recent works in this domain have mainly focused on direct manipulation of the raw red-green-blue (RGB) pixels, which only allows for edits involving relatively small shape changes. In other implementations, it is required to reconstruct a large area of the original image, often with complex shape operations. This can result in unwanted changes to parts of the image that should not be edited, as well as inaccuracy in achieving desired edits.

SUMMARY

The present disclosure describes techniques for editing images. More particularly, techniques are described for editing image attributes, such as the appearance of clothing items in an image, using a multi-stage approach to improve detail and accuracy in edited images.

In certain embodiments, the disclosed techniques include new and improved machine learning-based techniques, such as using multiple generative adversarial networks (GANs) to generate an edited image that applies the desired change to a target attribute, while leaving other regions of the image intact. For example, an input image includes a clothing item such as a shirt as well as a person wearing the clothing item. An edit parameter is established, so that the shirt should have long sleeves instead of short sleeves. A first generator neural network is used to establish the portion of the image to be modified with the long sleeves with the modification of the long sleeves added. A second generator neural network is used to infill this portion of the image, so that the long sleeves seamlessly extend on the targeted region without affecting other regions (e.g. other areas of the clothing item as well as the person depicted in the image).

In some embodiments, a computer-implemented method for image editing comprises performing, by a computing system, receiving an input image comprising a target region and an edit parameter specifying a modification to the target region; generating a parsing map of the input image, the parsing map identifying regions in the input image including the target region; generating a latent representation of the parsing map by providing the parsing map as input to a first neural network; applying an edit to the latent representation of the parsing map based on the edit parameter to generate an edited latent representation of the parsing map; providing the edited latent representation of the parsing map as input to a second neural network to generate a modified parsing map, wherein the modified parsing map comprises the target region with a shape change according to the edit parameter; based on the input image and the modified parsing map, generating a masked image corresponding to the shape change; and based on the masked image, using a third neural network to generate an edited image with the modification to the target region.

In some aspects, the target region corresponds to a clothing item. In some aspects, the method further comprises providing the masked image as input to a fourth neural network to generate a latent representation of the masked image, wherein using the third neural network to generate the edited image comprises providing the latent representation of the masked image as input to the third neural network, wherein the third neural network is trained to fill a masked portion of the masked image.

In some aspects, the method further comprises training the second neural network by generating, using the second neural network based upon a training parsing map, a generated parsing map; computing a reconstruction loss based upon a pixel regression between the training parsing map and the generated parsing map; computing an adversarial loss based upon comparing the training parsing map to the generated parsing map; computing an attribute manipulation loss based upon a classified attribute corresponding to the input parsing map; and updating the second neural network by minimizing a loss function comprising the reconstruction loss, the adversarial loss, and the attribute manipulation loss.

In some aspects, the second neural network is a generator neural network; and the second neural network is trained using a discriminator neural network, the discriminator neural network comprising a first branch configured to determine whether a training image is computer-generated and a second branch configured to predict an attribute vector specifying attributes of the training image.

In some aspects, the method further includes training the third neural network by generating, using the third neural network based upon an input training image, a generated training image; computing a reconstruction loss based upon the input training image and the generated training image; computing a mask loss based upon a masked version of the input training image and a masked version of the generated training image; computing an attribute manipulation loss based upon a classified attribute corresponding to the input training image; and updating the third neural network by minimizing a loss function comprising the reconstruction loss, the mask loss, and the attribute manipulation loss.

In some aspects, the third neural network comprises a generator neural network comprising a plurality of gated convolutional layers. In some aspects, the method further comprises causing display of a user interface comprising a plurality of interactive components configured to receive user-specified edits; receiving input specifying the edit parameter; and outputting the edited image to a computing device for display.

Various embodiments are described herein, including methods, systems, non-transitory computer-readable storage media storing programs, code, or instructions executable by one or more processors, and the like.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features, embodiments, and advantages of the present disclosure are better understood when the following Detailed Description is read with reference to the accompanying drawings.

DETAILED DESCRIPTION

Figure 1:
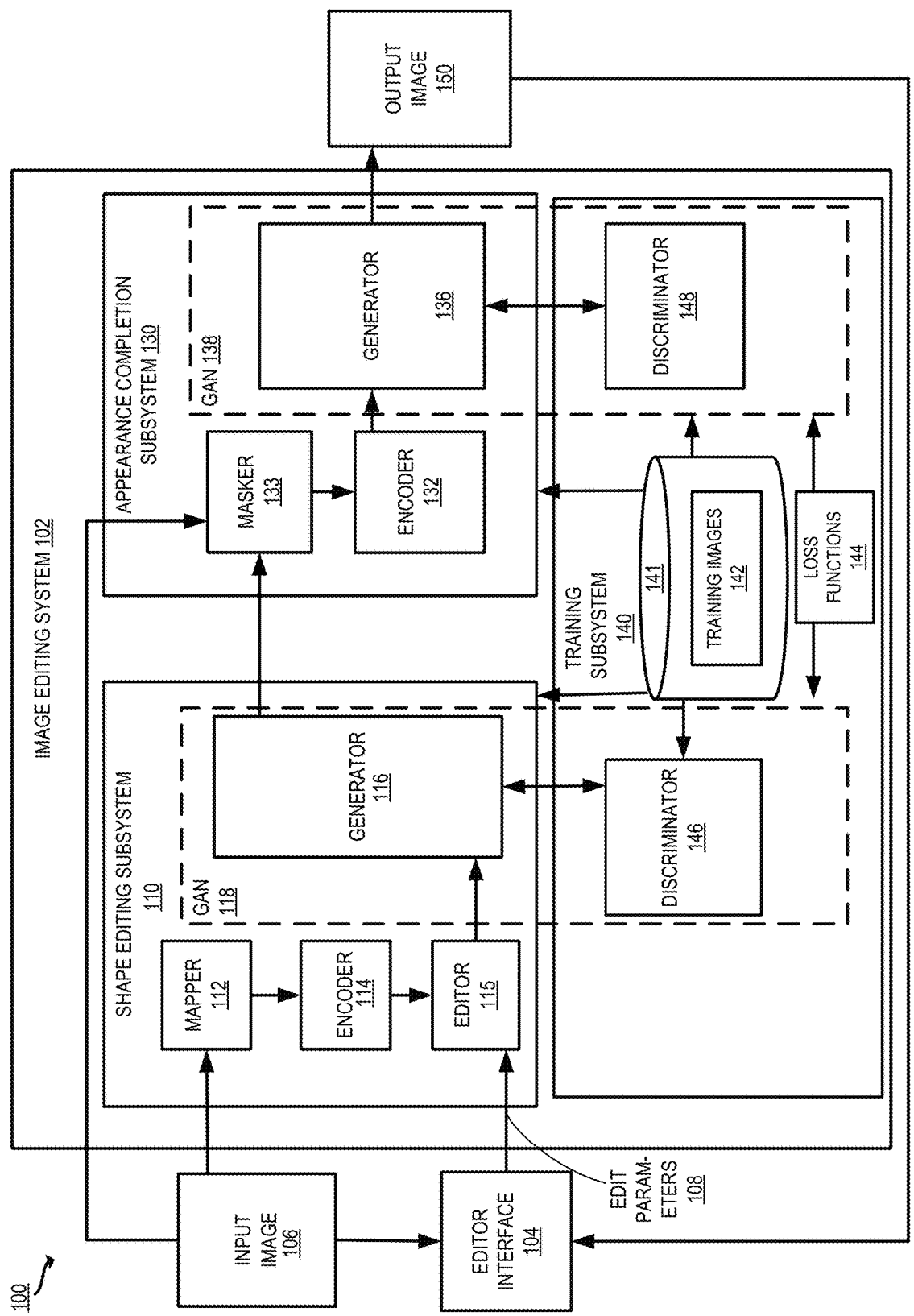
FIG. 1 depicts an example computing environment for image editing according to certain embodiments of the present disclosure.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure describes techniques for editing images to efficiently generate realistic and accurate edited images. More particularly, new and improved techniques are described for editing or modifying fashion attributes in images.

As noted above, attribute editing tasks aim to manipulate images based on a user-specified attribute, while preserving the details of the original image as much as possible. Recent works in this domain have mainly focused on direct manipulation of the raw RGB pixels, which only allows to perform edits involving relatively small shape changes. Image attribute editing presents two main challenges: 1) the desired target attribute often requires editing a large area of the original image, with complex shape operations, and 2) the source image details and identity should be retained in the attribute-irrelevant regions. Prior techniques largely perform the attribute editing directly on the raw RGB pixels and generate the whole RGB image from scratch. As the RGB image contains both shape and appearance information, these approaches can produce sub-optimal results as they require the manipulation of both shape and appearance at the same time. This limits existing methods to attribute editing tasks involving relatively small shape changes. These approaches fail on edits requiring relatively large shape changes. Moreover, since existing methods generate the whole RGB image from scratch, the edited image may not retain the source image details in attribute-irrelevant regions.

The techniques of the present disclosure address the shortcomings of these prior techniques by employing a two-stage shape-then-appearance editing strategy. This facilitates effective shape attribute editing while at the same time retaining the source image identity and fine-grained details. This can extend the editing capabilities to much larger shape changes, as compared to direct modification of the RGB pixels. To achieve this goal, the attribute editing task is separated into two conditional stages: shape editing, followed by appearance editing. In some embodiments, a shape editing network edits an input parsing map of an input image according to the attribute that should be altered. Compared to operating on the raw RGB image, parsing map editing enables performing more complex shape editing operations. After parsing, an appearance completion network takes as input the previous stage results and completes the shape difference regions to produce the final RGB image. The appearance completion network can fill gaps in the original RGB image and inpaint the attribute-relevant regions only, which allows to better retain the fine details and identity of the source image.

As an illustrative example, some image editing systems can be used to change the appearance of a clothing item, such as to increase the length of a garment. Using prior techniques, shape changes are limited, e.g., to slight changes in sleeve length. Using the improved image attribute editing techniques described herein, a user such as an online shopper can visualize the desired outfit and interactively "tailor" an outfit according to their personal preferences (e.g., remove or add sleeve to a t-shirt or dress, change clothing length, etc.). When applied to fashion attribute editing, the two-stage approach of the present disclosure enables performing more flexible shape manipulation and, in turn, more accurate attribute editing, as compared to prior techniques. Rather than operate on the input RGB images directly, the techniques of the present disclosure mainly operate on the semantic parsing map of the clothed human. A shape editing subsystem manipulates the parsing map of the fashion image based on the target attribute. The shape editing subsystem synthesizes a new parsing map. The new parsing map is provided to an appearance completion subsystem, which fills in pixel-level textures and other content to generate the final edited image. The two subsystems may include neural networks which are trained separately and used together at inference time to provide flexible and high-quality image manipulation.

The following non-limiting example is provided to introduce certain embodiments. In this example, an image editing system generates an edited image, based on an input image, using a shape editing subsystem to perform a first shape modification phase and an appearance completion subsystem to perform a second phase of generating a targeted portion of the edited image. In this example, the input image is a digital photograph of a person wearing a sleeveless dress. A user is interacting with an editor interface to see what the dress would look like with long sleeves.

The image editing system receives the input image and an edit parameter via the editor interface. The input image includes a target region to be edited—the dress. The edit parameter specifies the desired edit to the target region—to put long sleeves on the dress. The edit parameter may be accepted via the editor interface as value indicating a degree of modification to the sleeve (e.g., by user input moving a slider to control sleeve length). This edit parameter may be passed to the shape editing subsystem as an attribute vector indicating the edit to be made to the target region.

The shape editing subsystem generates a parsing map of the input image. The parsing map identifies regions of the input image, such as the dress, as well as other regions such as the head, hair, arms, and legs of the person depicted in the image. The shape editing subsystem generates a latent representation of the parsing map. The latent representation of the parsing map is a vector representation of the parsing map. The latent representation is generated by providing the parsing map as input to an encoder neural network which has been trained to generate the latent representation.

The shape editing subsystem applies an edit to the latent representation of the parsing map based on the edit parameter. The edits are applied by concatenating the latent representation of the parsing map and the attribute vector representing the edit parameter. The edited latent representation of the parsing map is then provided as input to a generator neural network, which has been trained to generate a modified parsing map based on the edited latent representation. The generated modified parsing map includes the target region of the dress with the specified shape change of long sleeves. The modified parsing map is provided to the appearance completion subsystem for further processing.

With the input of the modified parsing map, the appearance completion subsystem can identify a targeted region of the image to modify (e.g., the part of the arms to be covered with sleeves, which corresponds to the modified part of the parsing map). The appearance completion subsystem can leave the remaining portion of the input image essentially unchanged, which can provide improved detail and accuracy over traditional techniques that regenerate the entire image when performing edits.

The appearance completion subsystem generates a masked image corresponding to the shape change based on the input image and the modified parsing map. The appearance completion subsystem may generate a mask based on a difference between the input image and the modified parsing map. This difference specifies the attribute-relevant regions of the input image. The mask is then applied to the input image.

Based on the masked image, the appearance completion subsystem generates an edited image with the modification to the target region. The appearance completion subsystem may first generate a latent representation of the masked image using an encoder. The appearance completion subsystem can then provide the latent representation of the masked image to a generator, which produces an edited image with the desired modification of long sleeves. The generator has been trained to inpaint the region identified by the mask. The sleeves are generated to match the appearance of the rest of the dress. By focusing on the region to be changed, the image editing system can leave the remaining portion of the image intact without sacrificing accuracy or resolution, as is a problem in prior techniques.

Example of an Operating Environment for Image Attribute Editing

FIG. 1 depicts an example of a computing environment 100 including an image editing system 102 that provides capabilities for editing electronic content such as digital photos and images. For example, as depicted in FIG. 1, the image editing system 102 may receive as inputs an input image 106 that is to be edited and one or more edits to be made to the input image 106. The image editing system 102 is configured to edit the input image 106 per the edits and generate an output image 150 that is an edited representation of the input image 106 and incorporates the edits.

There are various ways in which the input image 106 and the edits to be made are input to the image editing system 102. In the example depicted in FIG. 1, the image editing system 102 may provide an editor interface 104 that a user may use to provide inputs regarding the input image 106 to be edited and the one or more edits (e.g., edit parameters 108 to be made to the input image 106). The image editing system 102 then generates an edited output image 150 by applying the user-provided edits to the input image 106. In certain embodiments, the edited output image 150 may be presented or output to the user using the editor interface 104.

In some embodiments, the editor interface 104 may include one or more Graphical User interfaces (GUIs) that enable a user to provide inputs identifying the input images, identifying the edits to be made, setting configuration parameters for the image editing system 102, and the like. For example, a GUI may include one or more user-selectable elements that enable a user to input images 106 to be edited. One or more GUIs provided by the editor interface 104 may include one or more upload elements for uploading content (e.g., an upload field to upload an image to be edited). In some implementations, the editor interface 104 responds to user selection of an upload element by transitioning to a view showing available files to upload, prompt a user to take a photo, or the like.

One or more GUIs provided by the editor interface 104 may also include user-selectable elements that enable a user to specify the edits or modifications to be performed. For example, a GUI may display one or more sliders that can be manipulated by the user, each slider corresponding to an attribute of the image to be edited. Other elements provided by the GUIs may include text entry fields, buttons, pull-down menus, and other user-selectable options. In certain implementations, the editor interface 104 may be part of a web interface which is capable of receiving and editing digital content (e.g., digital photographs or other images). For example, the editor interface 104 can be displayed on an online shopping website to allow a user to customize an item to be purchased in an image, such as a clothing item.

In some embodiments, the image editing system 102 and the editor interface 104 execute on a computing device, which may be used by a user. Examples of a computing device include, but are not limited to, a personal computer, a tablet computer, a desktop computer, a processing unit, any combination of these devices, or any other suitable device having one or more processors. In some other embodiments, the image editing system 102 and the editor interface 104 may operate on different computing systems, which may be communicatively coupled to each other. Examples of computer platform and implementations that may be used to implement the image editing system 102 are depicted in FIGS. 15 and 16 and described below.

The image editing system 102 may include multiple subsystems, which work in cooperation to generate edited output images 150. In the embodiment depicted in FIG. 1, the image editing system 102 includes a shape editing subsystem 110, an appearance completion subsystem 130, and a training subsystem 140. Computing environment 100 depicted in FIG. 1 is merely an example and is not intended to unduly limit the scope of claimed embodiments. Many variations, alternatives, and modifications are possible. For example, in some implementations, the image editing system 102 may have more or fewer subsystems than those shown in FIG. 1, may combine two or more subsystems, or may have a different configuration or arrangement of subsystems. In another example, the training subsystem may train one of the subsystems, and the other may be trained using another system. The various systems, subsystems, and other components depicted in FIG. 1 may be implemented in software (e.g., code, instructions, program) only executed by one or more processing units (e.g., processors, cores) of the respective systems, using hardware only, or combinations thereof. The software may be stored on a non-transitory storage medium (e.g., on a memory device).

The various subsystems of the image editing system 102 can be implemented in the same computing system or different, independently operated computing systems. For example, the shape editing subsystem 110 could be a separate entity from the appearance completion subsystem 130 and the training subsystem 140, or the same entity. The image editing system 102 may execute on a server separately from the editor interface 104, or other embodiments can involve the image editing system 102 being built into a software application executing the editor interface 104 on a user device.

One or more of the subsystems of the image editing system 102 include trained machine learning models or include components that use machine learning models that have been trained. For example, in the embodiment depicted in FIG. 1, the training may be performed by a training subsystem 140, which may perform the training using various training images 142. In some implementations, the training subsystem 140 includes, or is communicatively coupled to, one or more data storage units 141 for storing the training images 142.

The shape editing subsystem 110 generates a parsing map of an input image using a mapper 112. The parsing map is manipulated based on a target attribute specified by an edit parameter 108, which represents the image attribute to manipulate (e.g., sleeve or cloth length in an image including a clothing item). The shape editing subsystem 110 includes an encoder that takes as input the source parsing map and generates a latent representation of the source parsing map. An editor 115 manipulates the latent representation of the source parsing map to modify a shape of a target region, based on the edit parameter. A generator 116 generates a modified parsing map according to the edited latent representation produced by the editor 115. The appearance completion subsystem 130 edits pixels in specific regions identified by the shape editing subsystem 110. The appearance completion subsystem 130 includes a masker 133, an encoder 132, and a generator 136.

Together, the shape editing subsystem 110 and appearance completion subsystem 130 can personalize items depicted in an image. For example, the shape editing subsystem 110 and appearance completion subsystem can edit an input image to manipulate fashion attributes to act as a virtual tailor. In some implementations, the shape editing subsystem 110 and appearance completion subsystem 130 are used together at runtime for fashion attribute editing, and are collectively referred to as a Virtual Personal Tailor Network (VPTNet).

The shape editing subsystem 110 may receive as input an input image 106 to be edited. The input image 106 is processed by a mapper 112, which is configured to generate a parsing map of the input image. A parsing map identifies different regions in an image, and may be represented by a set of binary masks defining the regions. For example, a parsing map can indicate regions in an image of a person wearing clothing corresponding to a head, arm, leg, shirt, hat, and so forth. As another example, a parsing map can indicate regions in an image of a living room corresponding to a coffee table, couch, window, and so forth. The mapper 112 can be a neural network trained to generate a parsing map of an input image.

The encoder 114 includes one or more machine learning models trained to generate a latent representation of an input image, where the latent representation is a multi-dimensional vector representation of the image. In some implementations, the encoder 114 is or includes a neural network. The encoder takes as input the source parsing map and transforms it into a latent representation of the parsing map.

The latent representation is a string of numbers (e.g., a n-dimensional vector, containing a value for each of the n-dimensions) that, when provided as input to the generator, creates a particular image (e.g., to replicate the image used to generate the latent representation, with any applied edits). The encoder 114 is a machine learning model trained to generate such a latent representation. The encoder 114 may, for example, be a feed forward network trained to encode an image. Given an input image and a generator 116, the encoder 114 discovers a latent representation of the input image, such that when the latent representation is input to the generator 116, the resulting generated image perceptually resembles the target input image.

The editor 115 applies changes to the latent representation based upon edit parameters 108. For example, the editor 115 applies linear and/or nonlinear modifications to the latent representation based on training indicating that these modifications will cause a desired change in the ultimate output image (e.g., to make a dress depicted in an image appear longer or shorter, or to make a person depicted in an image appear to smile or be older, etc.). In some implementations, the edit is applied by concatenating a target attribute vector with the latent representation. The editor 115 generates as output a modified latent representation, which can be a vector string of numbers reflecting applied edits.

In some embodiments, the generator 116 includes a machine learning model which has been trained to generate a generated image based on an input latent representation. In some implementations, the generator 116 is a neural network. The generator 116 is pretrained to generate an image that looks as close as possible to an input image. In some embodiments, the generator 116 is trained to generate a parsing map, which is similar to the parsing map generated by the mapper 112, with edits applied by the editor 115. In some implementations, the generator 116 is part of a Generative Adversarial Network (GAN) 118, and is trained in a zero-sum game with the discriminator 146. In some implementations, the generator 116 and the encoder 112 are a single network and are trained together.

The appearance completion subsystem 130 takes as input the modified parsing map produced by the shape editing subsystem 110 and generates an output image 150 which reflects the edit parameters 108 applied to the input image

106. The appearance completion subsystem 130 includes a masker 133, an encoder 132, and a generator 136.

The masker 133 is configured to generate a masked image. The masker may receive as input the input image 106 and the modified parsing map generated by the shape editing subsystem 110. The masker 133 may generate a masked image so that the target region of the input image 106 is masked out in the masked image.

The encoder 132 includes one or more machine learning models trained to generate a latent representation of an input image, where the latent representation is a multi-dimensional vector representation of the image. The encoder 132 may be similar to the encoder 114 described above with respect to shape editing subsystem 110.

The generator 136, similarly to the generator 116 described above, can be a generator neural network configured to generate an image based on a latent representation. The generator 136 may be trained to produce an image by inpainting a specific region identified by the shape editing subsystem 110. In other words, the generator 136 generates a targeted region of the image (e.g., sleeves if sleeves are added, arms if sleeves are removed, and so forth). This may be performed without modifying other regions of the image. In some implementations, the generator 136 includes multiple gated convolutional layers, which has proven to be an effective architecture for image inpainting tasks. In some implementations, the generator 136 is part of a GAN 138, and is trained in a zero-sum game with the discriminator 148. In some implementations, the generator 136 and the encoder 132 are a single network and are trained together.

In some embodiments, the training subsystem 140 trains one or more components of the shape editing subsystem 110 and the appearance completion subsystem 130 using the training images 142. In some implementations, the training subsystem 140 trains the generators 116 and 136 using respective discriminators 146 and 148. In some implementations, the training subsystem 140 trains the discriminators 146 and 148 using one or more loss functions 144.

The training subsystem 140 includes hardware and/or software configured to train one or more machine learning models as used by the image editing system 102. The training subsystem 140 includes discriminators 146 and 148. Discriminators 146 and 148 are neural networks (e.g., discriminator neural networks). In some implementations, the discriminator 146 is part of a Generative Adversarial Network (GAN) 118 including the generator 116, and evaluates the output of the generator 116 to train the generator 116. The discriminator 146 compares images produced by the generator 116 to target images (e.g., digital photographs, drawings, or the like). The discriminator 146 generates a score based on the comparison. For example, the GAN is trained on images corresponding to parsing maps. The score generated by the discriminator 146 indicates whether the discriminator 146 has determined that an image generated by the generator 116 is likely to be a real parsing map or a computer-generated parsing map generated by the generator 116. The generator 116 is trained to "trick" the discriminator into determining that a generated image is actually a target image such as a parsing map. Such a competition between the discriminator 146 and the generator 116 can be used to teach the generator 116 to recreate images with a great deal of accuracy.

In some embodiments, the discriminator 146 includes multiple branches. The discriminator may include an adversarial branch configured to determine whether a training image is computer-generated. The discriminator 146 may further include and a second branch configured to predict an attribute vector specifying attributes of the training image (e.g., an attribute classification branch).

Similarly, the discriminator 148 is part of a GAN 138 including the generator 136 and the discriminator 148, and the discriminator 148 is trained in tandem with the generator 136. The GAN 138 may be trained on input images corresponding to digital photographs to teach the generator 136 to output a photorealistic image. In some embodiments, the GAN 138 is trained on masked training images generated by creating masks on-the-fly, as described in further detail below with respect to FIG. 3B.

In some embodiments, the discriminator 148 includes an attribute classifier trained to predict an attribute vector for an input image. For example, an attribute vector may specify whether an image includes a shirt with long sleeves, or whether the image includes a face with a smile. In some implementations, the attribute classifier includes multiple layers. The attribute classifier may, for example, include five convolutional layers and two fully-connected layers. In some implementations, the discriminator may include an adversarial branch as well as the attribute classifier, similarly to the discriminator 146 of the shape editing subsystem 110.

The training subsystem 140 further includes one or more loss functions 144 that are minimized to train the GANs 118 and 138 to generate images. The loss functions 144 may include multiple components specialized to train each of the generators 116 and 136, as described below with respect to FIGS. 3A and 3B.

The data storage unit 141 can be implemented as one or more databases or one or more data servers. The data storage unit 141 includes training images 142 that are used by the training subsystem 140 to train the engines of the image editing system 102. The training images 142 may include real images, synthetic images (e.g., as generated by the GAN), and/or semantic mapping images.

Example Techniques for Multi-Stage Image Editing

Figure 2:
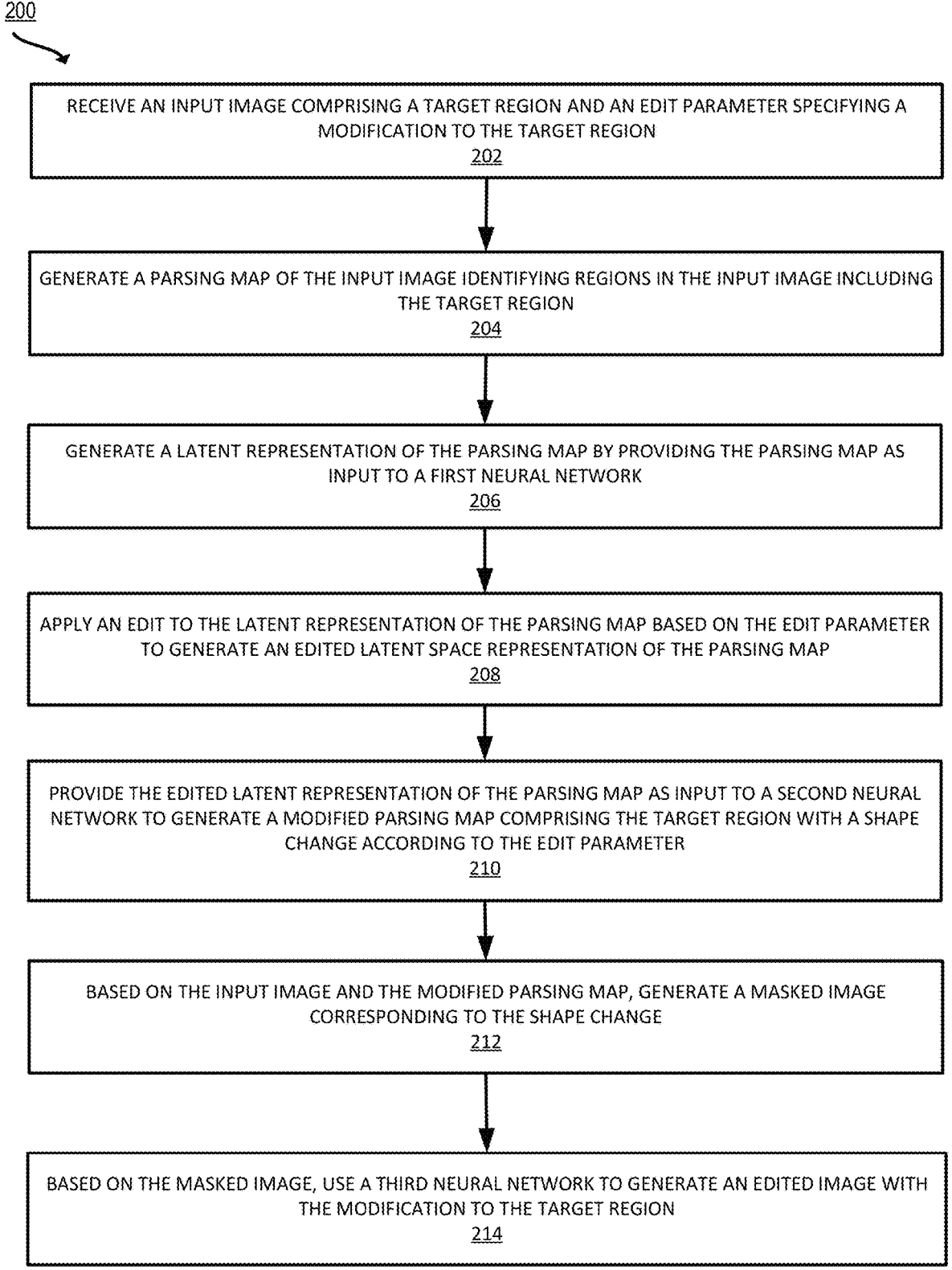
FIG. 2 depicts an example method for image attribute editing according to certain embodiments of the present disclosure.

FIG. 2 is a flowchart of an example process 200 for multi-stage image editing according to certain embodiments of the present disclosure. The processing depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 2 and described below is intended to be illustrative and non-limiting. Although FIG. 2 depicts the various processing steps occurring in a particular sequence or order, this is not intended to be limiting. In certain alternative embodiments, the processing may be performed in some different order or some steps may also be performed in parallel. In some implementations, one or more process blocks of FIG. 2 may be performed by an image editing system (e.g., the shape editing subsystem 110 and appearance completion subsystem 130 in cooperation with other components of the image editing system 102 of FIG. 1). In some implementations, one or more process blocks of FIG. 2 may be performed by another device or a group of devices separate from or including the image editing system 102 (e.g., the editor interface 104 executing on a user device).

In some embodiments, at 202, the image editing system (e.g., the shape editing subsystem) obtains an input image and an edit parameter. The input image includes a target region and the edit parameter specifies a modification to the target region. In some implementations, the target region corresponds to a clothing item. For example, the input image depicts a person wearing a short-sleeved shirt, and the edit parameter specifies that the sleeves should be made longer. As other examples, the target region may correspond to a sofa to be edited to be longer or shorter or a car to be edited to be lifted or lowered.

The image editing system may receive an input image from a web server and/or a user device. Alternatively, or additionally, the image editing subsystem may retrieve the input image from a local or remote database. The input image may be an image file that is to be edited (e.g., to change the style of a clothing item, as shown in FIGS. 4-7).

The image editing system may receive the edit parameter via user input. The edit parameter can be a metric specifying a degree of modification to make to a particular aspect of an image. In some implementations, the edit parameter is a target attribute vector, which represents an attribute to manipulate. For example, the target attribute is a fashion attribute such as sleeve length or skirt length, and the edit parameter quantifies a degree of modification to be applied to the target attribute. As a specific example, a change in skirt length can be specified on a scale from 1 (very short) to 10 (very long). To provide the edit parameter, a user may interact with a user interface to control edits to the input image. For example, the image editing system causes display of a user interface that includes interactive components configured to receive user-specified edits. The image editing system receives input specifying the edit parameter. As a specific example, a user interacts with a slider on a user interface that is part of a website. The slider is manipulated to control how much longer or shorter to make sleeves on a clothing item depicted in the input image. The edit parameter for the user-specified edit is transmitted to the image editing system.

At 204, the image editing system (e.g., the shape editing subsystem) generates a parsing map of the input image. The parsing map identifies regions in the input image including the target region. The shape editing subsystem 110 may provide the input image as input to the mapper 112. As described above with respect to FIG. 1, the mapper 112 can be a neural network trained to generate a parsing map of an input image, where the parsing map identifies different regions of the image. For example, the parsing map separates the image into different regions such as a shirt, a face, an arm, a skirt, and a background. These regions may be defined using binary attributes corresponding to the semantic parsing of the elements of a target image. For example, the parsing map may consist of a set of binary masks, each corresponding to the semantic parsing of a clothed human, such as hair, shirt, legs, and so forth. Techniques for semantic image parsing are described in further detail in, e.g., Yamaguchi et al., "Parsing Clothing in Fashion Photographs," 2012 *IEEE Conference on Computer Vision and Pattern Recognition*, pp. 3570-3577, doi: 10.1109/CVPR.2012.6248101 (2012).

At 206, the image editing system (e.g., the shape editing subsystem) generates a latent representation of the parsing map. The image editing system produces the latent representation of the parsing map by providing the parsing map as input to a first neural network. For example, the parsing map is provided as input to encoder 114. As described above with respect to FIG. 1, the encoder 114 can be a neural network trained to generate a latent representation of an input image, where the latent representation is a multi-dimensional vector representation of the image.

At 208, the image editing system (e.g., the shape editing subsystem) applies an edit to the latent representation of the parsing map based on the edit parameter to generate an edited latent representation of the parsing map. The goal of this stage is to manipulate the source parsing map based on the edit parameter. For example, the latent representation is concatenated with the target attribute vector representing the edit parameter. The application of the edit modifies the latent representation in order to manipulate the target region of the parsing map into a target shape, based on the edit parameter.

In some embodiments, multiple attributes are modified substantially simultaneously. For example, in an image including a shirt, the shirt is made longer and the sleeves are made shorter at the same time. The target attribute vector may, for example, reflect multiple attribute changes, or multiple attribute vectors may be applied.

At 210, the image editing system (e.g., the shape editing subsystem) generates a modified parsing map. The modified parsing map includes the target region with a shape change according to the edit parameter. For example, if the edit parameter specifies that sleeves of a shirt should be shortened, the target region defining a shirt in an image may be modified in shape so that a portion of the sleeve area is removed from the target region. The modified parsing map may be generated by providing the edited latent representation of the parsing map as input to a second neural network to generate the modified parsing map. The second neural network may be or may include the generator 116 shown in FIG. 1.

In some embodiments, to generate the modified parsing map, the editor 115 provides the edited latent representation of the parsing map as input to the second neural network (e.g., the generator 116). As described above with respect to FIG. 1, the generator 116 can be a generator neural network trained to generate an image based on a latent representation. Techniques for image generation with a generator neural network are described in detail in, e.g., Goodfellow et al., *Generative Adversarial Nets*, NIPS 2014, arXiv: 1406.2661v1 (2014). In some implementations, the edited latent representation of the parsing map is provided to the generator 116. Based on the edited latent representation of the parsing map, the second neural network generates a parsing map reflecting the applied edits. For example, the original parsing map defines regions of an image including a face, hair, arms, and a dress. The edited parsing map defines the same regions, but the region corresponding to the dress is modified so that the dress is longer.

One or more operations in blocks 204-210 implement a step for generating a modified parsing map using one or more trained neural networks, wherein the modified parsing map comprises the target region with a shape change according to the edit parameter. For instance, at block 204, the shape editing subsystem generates a parsing map of the input image, at block 206, the shape editing subsystem generates a latent representation of the parsing map, at block at 208, the shape editing subsystem applies an edit to the latent representation of the parsing map based on the edit parameter to generate an edited latent representation of the parsing map, and at block 210, the shape editing subsystem generates a modified parsing map, as described above.

At 212, the image editing system (e.g., the masker of the appearance completion subsystem) generates a masked image corresponding to the shape change based on the input image and the modified parsing map. For example, a difference between the input image and the modified parsing map is determined. This difference specifies the attribute-relevant regions of the input image. In some implementations, the masker computes a shape difference for the target region, $$M_{\mathit{diff}} = [x^a - (x^a \odot x^b)] + [x^b - (x^a \odot x^b)]$$ [1], where $M_{diff}$ is the shape difference caused by the attribute editing operation, $x^a$ is the original parsing map generated at 204, and $x^b$ is the modified parsing map generated at 210, and these parsing maps are piecewise multiplied and subtracted from $x^a$ and $x^b$ respectively. This shape difference $M_{diff}$ can then be used to generate the masked image corresponding to the shape change as:

$$I^a \odot (1-M_{diff}) \quad [2],$$

the input image $I^a$ received at 202 multiplied by the inversion of the shape difference mask $M_{diff}$. This is the original input image with a mask indicating the region to be modified. By focusing on the masked region to apply edits, the remaining portion of the image need not be regenerated, which allows for improved detail and accuracy, as shown in the example results depicted in FIGS. 4-7.

In some embodiments, at 214, the image editing system (e.g., the appearance completion subsystem) generates an edited image with the modification to the target region. Based on the masked image, a third neural network is used to generate the edited image. The third neural network may include a generator neural network (e.g., generator 136 of FIG. 1).

In some embodiments, the masked image is first input to a fourth neural network (e.g., encoder 132) to generate a latent representation of the masked image. The input to the fourth neural network may be the concatenation of the modified parsing map $x^b$, the shape difference mask shape difference $M_{diff}$, and the masked image given by equation [2] above. Based on this input, the fourth neural network generates a latent representation, which may be performed in a similar fashion as described above with respect to block 206.

The appearance completion subsystem may then provide the latent representation of the masked image as input to the third neural network, wherein the third neural network is trained to fill a masked portion of the masked image. In some embodiments, the third neural network performs inpainting under the guidance of the input parsing map. The third neural network may be pretrained to inpaint the shape difference regions so that the inpainted regions are semantically aligned with the synthesized parsing map generated at inference time. Essentially, the third neural network fills the gaps in the masked image based on the rest of the target region. For example, the target region is a shirt, and the shirt is to be lengthened. The color, texture, and other properties of the shirt are extended into the masked region to lengthen the shirt.

One or more operations in blocks 212-214 implement a step for generating an edited image using one or more additional trained neural networks, wherein the edited image has the modification to the target region. For instance, at block 212, the appearance completion subsystem generates a masked image corresponding to the shape change based on the input image and the modified parsing map, and at block 214, the appearance completion subsystem) generates an edited image with modifications to the target region according to the edit parameter, as described above.

In some embodiments, the process 200 further includes outputting the edited image to a computing device for display. The computing device may correspond to the editor interface 104 depicted in FIG. 1 (e.g., executing on a user device or the image editing system itself). For example, the image editing system outputs the edited image to a user device, thereby causing the user device to display the edited image via the editor interface displayed on the user device. Alternatively, or additionally, the image editing system transmits instructions for rendering the edited image to an external computing device. Alternatively, or additionally, the image editing system renders the edited image on a display component of the image editing system itself.

Advantageously, by surgically operating on the target region of the image with the appearance completion subsystem 130, the image generation process does not operate on the entire input image 106. As a result, the techniques of process 200 can preserve fine-grain details. By decoupling the shape editing process, the shape edits can also be performed more accurately without the need to focus on the appearance beyond the shape in the first phase. In contrast to traditional techniques that operate to directly recreate each RGB pixel of the input image, the process 200 maintains detail and similarity to unedited regions, as shown in the example results depicted in FIGS. 4-7.

Example Training Techniques for Machine Learning Models for Attribute Editing

Figure 3A:
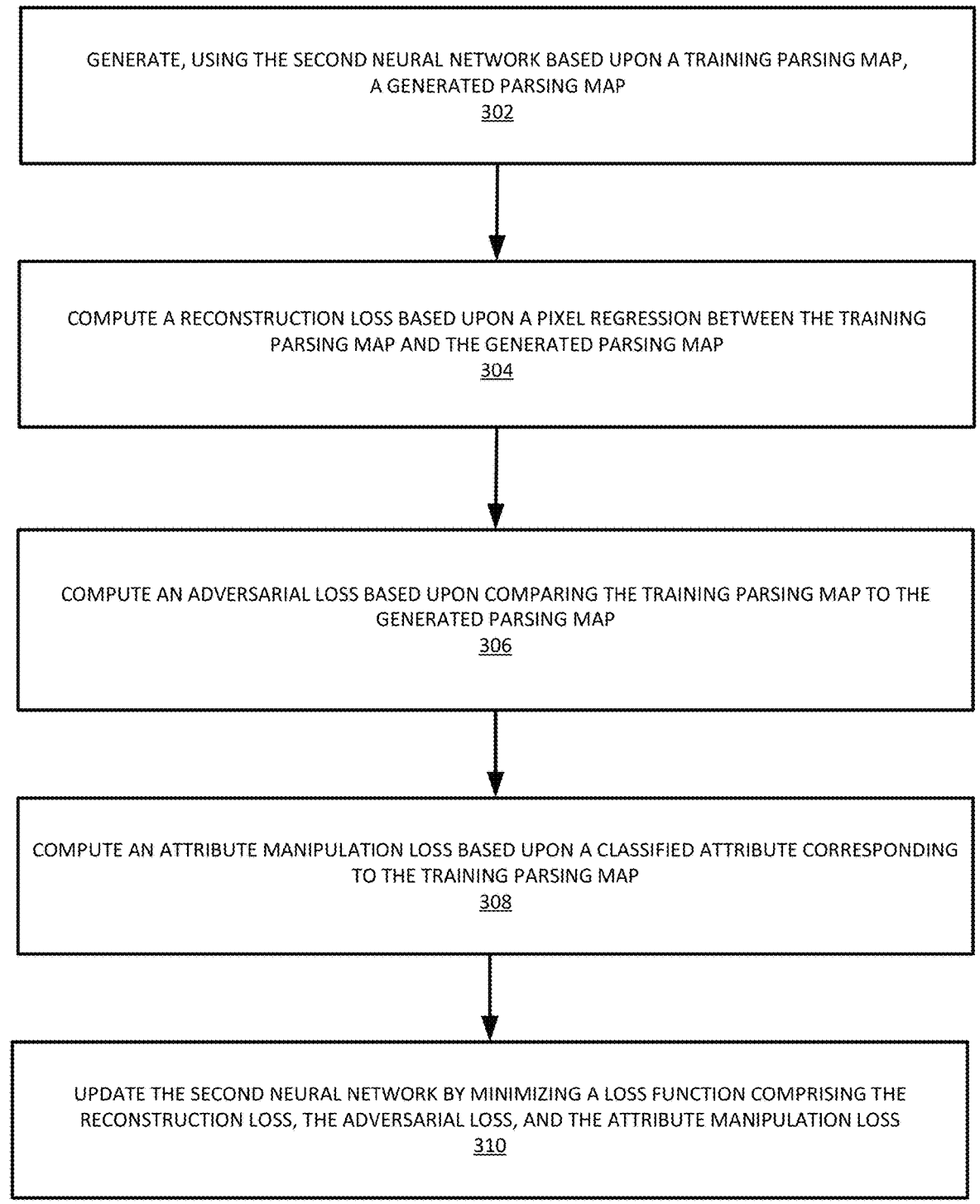
FIG. 3A depicts an example method for training a neural network for a first part of multi-stage image attribute editing according to certain embodiments of the present disclosure.
Figure 3B:
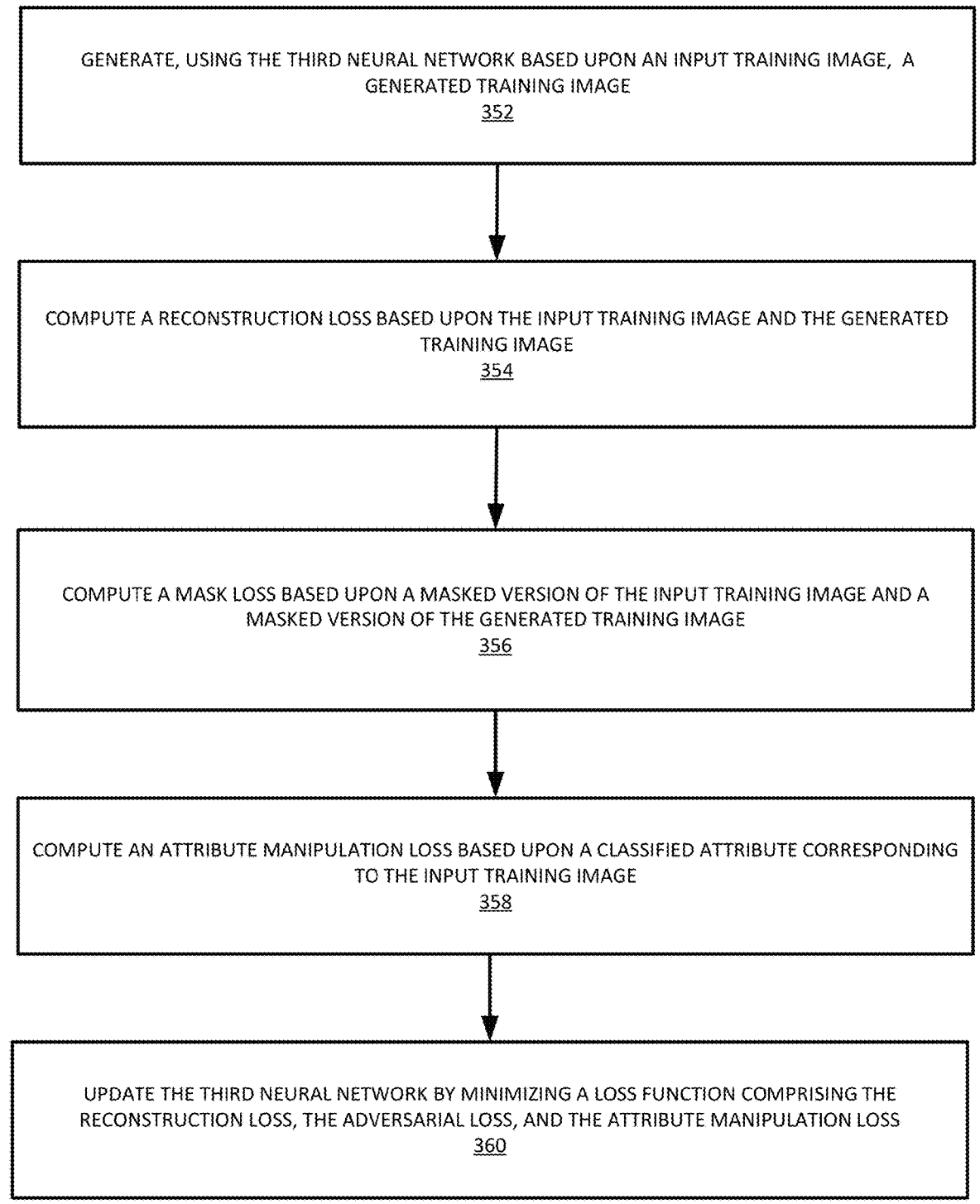
FIG. 3B depicts an example method for training a neural network for a second part of multi-stage image attribute editing according to certain embodiments of the present disclosure.

FIG. 3A and FIG. 3B are flowcharts of an example processes 300 and 350 for training machine learning models for attribute editing, according to certain embodiments of the present disclosure. The processing depicted in FIG. 3A and FIG. 3B may be implemented in software (e.g., code, instructions, program) executed by one or more processing units (e.g., processors, cores) of the respective systems, using hardware, or combinations thereof. The software may be stored on a non-transitory storage medium (e.g., on a memory device). The methods presented in FIG. FIGS. 3A and 3B and described below are intended to be illustrative and non-limiting. Although FIG. 3A and FIG. 3B depict the various processing steps occurring in a particular sequence or order, this is not intended to be limiting. In certain alternative embodiments, the processing may be performed in some different order or some steps may also be performed in parallel. In some implementations, one or more process blocks of FIG. 3A and FIG. 3B may be performed by an image editing system (e.g., the training subsystem 140 in cooperation with other components of the image editing system 102 of FIG. 1).

FIG. 3A illustrates a method 300 for training a neural network for generating a modified parsing map, according to some embodiments. The method 300 of FIG. 3A can be used to train the generator 116 of the shape editing subsystem 110 depicted in FIG. 1. As noted above, in some implementations, the generator 116 and the encoder 114 are a single network trained together. The following describes training the generator 116, although it should be understood that this may also include training a joint encoder 112—generator 116 network in some implementations. This generator 116 (e.g., the second neural network of block 210) can be used to generate a modified parsing map at runtime, as described with respect to block 210 of FIG. 2.

As described above with respect to FIG. 1, the generator 116 may be trained adversarially with the discriminator 146. In some implementations, the discriminator 146 is composed of two branches, an adversarial branch used to determine whether an image is fake (e.g., computer-generated) or real (e.g., a digital photograph), and an attribute branch that is used to predict an attribute vector.

At block 302, the training subsystem generates, using the second neural network based on a training parsing map, a generated parsing map of a training image. In some implementations, the generated parsing map of the training image is produced in a similar fashion as described above with respect to blocks 204-210 of FIG. 2. The input training image is used to generate a parsing map, and the parsing map is provided to the encoder, which generates a latent representation of a parsing map of the input training image. The latent representation of the parsing map may then be edited based on an edit parameter, and provided as input to the second neural network (e.g., the generator 116). The generator then generates the generated parsing map of the training image, which is a parsing map of the input training image, modified based upon the edit parameter.

At block 304, the training subsystem computes a reconstruction loss based upon a pixel regression loss between the training parsing map and the generated parsing map. In some implementations, the reconstruction loss is the L1 pixel regression loss between the input training parsing map and the generated parsing map when the target attribute is the same as the source attribute. Techniques for computing an L1 loss with respect to image pixels are described in, e.g., "Loss Functions for Image Restoration With Neural Networks," in *IEEE Transactions on Computational Imaging*, vol. 3, no. 1, pp. 47-57, doi: 10.1109/TCI.2016.2644865 (2017).

At block 306, the training subsystem computes an adversarial loss based upon comparing the training parsing map to the generated parsing map. The adversarial loss is a loss function or component that quantifies a degree of difference between the generated parsing map generated by the generator and the training parsing map. Minimizing this loss trains the generator 116 to produce as similar of a parsing map as possible to the input training parsing map. Minimizing the adversarial loss teaches the second neural network to generate a visually appealing and visually realistic parsing mask. In some implementations, the adversarial loss is computed as described in Arjovsky et al., "Wasserstein GAN," arXiv preprint arXiv:1701.07875 (2017) and Ishaan Gulrajani, Faruk Ahmed, Martin Arjovsky, Vincent Dumoulin, and Aaron C Courville, "Improved Training of Wasserstein GANs," in *Advances in Neural Information Processing Systems*, at pp. 5767-5777 (2017).

At block 308, the training subsystem computes an attribute manipulation loss based upon a classified attribute corresponding to the training parsing map. The attribute manipulation loss is used to enforce that the synthesized parsing map correctly possesses the desired target attribute. The attribute manipulation loss may be computed based on a classification network, which provides as output an attribute vector of a parsing mask generated by the second neural network. The attribute manipulation loss is a function which, when minimized, enforces the second neural network to be able to produce an image with an attribute vector that is as close as possible to the attribute vector of the input image. For example, based on input specifying to generate an image including a shirt with long sleeves, the second neural network learns to be able to generate the parsing mask of a t-shirt with long sleeves.

At block 310, the training subsystem updates the second neural network by minimizing a loss function comprising the reconstruction loss, the adversarial loss, and the attribute manipulation loss. As noted above, in some implementations, the first neural network may also be trained together with the second neural network, and both networks are updated. For example, the loss function used to train the second neural network (e.g., generator 116) is given by $$L_G = -L_{G_{adv}} + \lambda_2 L_{G_{att}} + \lambda_3 L_{rec} \qquad [3],$$

where $L_G$ is the loss function used to train the generator 116, $L_{G_{adv}}$ is the adversarial loss computed at block 306, $L_{G_{att}}$ is the attribute manipulation loss computed at block 308, and $L_{rec}$ is the reconstruction loss computed at block 304. Each of these loss components may be weighted. For example, the adversarial loss is weighted by a constant such as −1, the attribute manipulation loss is weighted by a second constant, $\lambda_2$, and the reconstruction loss is weighted by a third constant, $\lambda_3$. The constants may be adjusted in a suitable manner. For example, in some implementations, $\lambda_2=10$ and $\lambda_3=100$, which places the highest weight on the reconstruction loss component and the second-highest weight on the attribute manipulation loss component, which has been found to provide accurate results in generating a modified parsing map.

The loss function $L_G$ may be minimized to train the generator 116 to accurately produce a generated parsing map based on an input image and an edit parameter. The training subsystem updates the generator neural network by minimizing the loss $L_G$. For example, the generator neural network includes multiple nodes including an output layer, an input layer, and intermediate layers. Weights associated with the nodes are updated according to the minimized loss. In some implementations, the training subsystem uses backpropagation to trace the loss back from the output layer through the intermediate layers of the generator to the input layer. The values of the weights associated with the connections between the nodes in the neural network are thereby updated. The error is backpropagated through the layers by adjusting the weights associated with connections of nodes at each layer. This process may be repeated until the output error is below a predetermined threshold.

The discriminator can be trained adversarially with the generator using the loss function $$L_D = -L_{D_{adv}} + \lambda_1 L_{D_{att}} \qquad [4],$$

where $L_{D_{adv}}$ is an adversarial loss, $L_{D_{att}}$ is an attribute prediction loss, and $\lambda_1$ is a constant used to weight the loss components. In some implementations, $\lambda_1=1$. The loss function $L_D$ may be minimized to adjust weights in the discriminator 146 to train the discriminator 146 to more accurately assess images generated by the generator, which improves the generator through the adversarial training process. The aim is for the generator to generate a parsing mask that looks essentially exactly the same as the training parsing mask. If that is not the case, then the training continues. In some implementations, the adversarial loss is used to train the adversarial branch of the discriminator and the attribute prediction loss is used to train the attribute prediction branch of the discriminator.

The loss function described above can be used to train the second neural network to generate a parsing map that is visually similar to the input parsing map, with the correct modification to the target region based on the edit parameter(s). This can be a challenging training process in that there is a lack of ground truth to train the second neural network to generate a different shape for the target region. For example, there may not be a training image for shirts with every possible sleeve length that also look the same otherwise. To address this, the reconstruction loss, adversarial loss, and attribute manipulation losses are implemented. In particular, the attribute manipulation loss teaches the second neural network to accurately modify attributes in the target region, while the reconstruction loss and adversarial loss teach the second neural network to accurately reproduce the input parsing map.

FIG. 3B illustrates a method 350 for training a neural network for generating an edited image, according to some embodiments. The method 350 of FIG. 3B can be used to train the generator 136 of the appearance completion subsystem 130 depicted in FIG. 1. As noted above, in some implementations, the generator 136 is implemented as a single neural network with the encoder 132, and they are trained together. The following describes training the generator 136, although it should be understood that this may also include training a joint encoder 132—generator 136 network in some implementations. This generator 136 (e.g., the third neural network of block 214 of FIG. 2) can be used to generate an output edited image at runtime, as described with respect to block 214 of FIG. 2. As described above with respect to FIG. 1, the generator 136 may be trained adversarially with the discriminator 148.

At block 352, the training subsystem generates, using the third neural network based on an input training image, a generated training image. In some implementations, the input training image is masked before providing the masked training image to the third neural network to generate the generated training image.

In some embodiments, the training subsystem generates training masks on-the-fly. The training subsystem may automatically generate training masks to resemble the shape differences generated at inference time and use the training masks during training. For example, the training subsystem may generate a training mask that covers part of a clothing item such as the lower part of the sleeves. As another example, the training subsystem may generate a training mask to cover part of a car such as a spoiler. The training subsystem may generate a training set that looks like the inpainting task to be performed, such as an image including a long-sleeved shirt, and an image including a sleeveless version of the shirt. Using the generated mask, the training subsystem may generate a masked training image in a similar fashion as described above with respect to block 212 of FIG. 2.

In some implementations, the input training image, which may be in masked form, is provided to the encoder 132, which generates a latent representation of the input training image. This may be performed in a similar fashion as described above with respect to block 206 of FIG. 2. The latent representation is then provided to the third neural network (e.g., the generator 136), which generates the generated training image. This may be performed in a similar fashion as described above with respect to block 214 of FIG. 2.

At block 354, the training subsystem computes a reconstruction loss based upon the generated training image and the input training image. Similarly to the reconstruction loss described above with respect to block 304 of FIG. 3A, the reconstruction loss can be computed using pixel regression between the training image and the generated image. In some implementations, the reconstruction loss includes the L1 and structural similarity (SSIM) losses between the generated training image and the input training image. (See, e.g., Zhao et al., supra).

At block 356, the training subsystem computes a mask loss based upon a masked version of the input training image and a masked version of the generated training image. In some implementations, the mask loss is given by the loss between M⊙I, the masked input training image, and M⊙I', the masked generated image.

At block 358, the training subsystem computes an attribute manipulation loss based upon a classified attribute corresponding to the input training image. The attribute manipulation loss can teach the third neural network to successfully generate images with a particular target attribute. The attribute manipulation loss may be computed in a similar fashion as described above with respect to block 308 of FIG. 3A.

At block 360, the training subsystem updates the third neural network by minimizing a loss function comprising the reconstruction loss, the mask loss, and the attribute manipulation loss. For example, the loss function used to train the third neural network (e.g., generator 116) is given by:

$$L_G = \lambda_1 L_{recon} + \lambda_2 L_{hole} + \lambda_3 L_{G_{att}} \qquad [5],$$

where $L_G$ is the loss function used to train the generator 136, $L_{recon}$ is the reconstruction loss computed at block 354, $L_{hole}$ is the mask loss computed at block 356, and $L_{G_{att}}$ is the attribute manipulation loss computed at block 358. Each of these loss components may be weighted. For example, the reconstruction loss is weighted by a first constant, $\lambda_1$, the mask loss is weighted by a second constant, $\lambda_2$, and the attribute manipulation loss is weighted by a third constant, $\lambda_3$. The constants may be adjusted in a suitable manner. For example, in some implementations, $\lambda_1=1$, $\lambda_2=5$, and $\lambda_3=1$, which places the highest weight on the mask loss component.

The loss function $L_G$ may be minimized to adjust weights in the generator 136 to train the generator 116 to accurately produce a generated output image based on an input image, in a similar fashion as described above with respect to block 310 of FIG. 3A. The discriminator 148 and generator 136 may be are jointly trained.

The discriminator can be trained adversarially with the generator using the loss function $$L_D = L_{D_{att}} \qquad [6],$$

where $L_{D_{att}}$ is an attribute prediction loss. The loss function $L_D$ may be minimized to adjust weights in the discriminator 146 to train the discriminator 146 to more accurately assess images generated by the generator, which improves the generator through the adversarial training process. As noted above, in some implementations, the fourth neural network may also be trained together with the third neural network, and both networks are updated.

The specialized loss functions of equations 5 and 6 can produce a machine-learning model that produces improved results over prior techniques. For example, approaches of classical inpainting works may not be directly applicable in this context. Inpainting networks are typically trained using unstructured training masks which may be free-form, rect-angles, scribbles, etc. These techniques may fail to train the neural network to accurately inpaint a target region. Typical inpainting networks they would simply try to replace part of the image with something that looks realistic. Further, conventional inpainting networks are trained to fill the mask regions with anything plausible, which would not provide for a realistic extension of the target region. Traditional training techniques may fail to provide the specific structure and meaning needed to generate a new part of an image with a specific appearance. For example, to generate new sleeves, a very specific structure and semantic meaning is needed. Using the specialized training techniques of the process 350, the generator neural network 136 is trained to inpaint the target region while respecting the input semantic parsing map.

Example Results—Multi-Stage Image Attribute Editing

Results of the multi-stage image attribute editing techniques described above provide improved results over prior techniques, based on quantitative and qualitative measures. For these examples, the techniques are applied for fashion attribute editing. The results are compared to state-of-the-art image editing techniques—AMGAN and Fashion-AttGAN, two fashion attribute editing methods, and STGAN and AttGAN, two face attribute editing methods. The techniques for fashion attribute editing are evaluated on the DeepFashion-Synthesis dataset, consisting of 78,979 images. We perform editing on two fashion attributes: sleeve length (long, short, sleeveless) and cloth length (e.g., for a shirt, dress, or skirt).

For the following quantitative results, the performance of the attribute editing techniques of the present disclosure are evaluated according to two aspects, attribute editing accuracy and final image overall quality (via a user study).

To measure the attribute editing accuracy, an attribute classifier is used to compute a classification accuracy score of an attribute classifier. This provides an evaluation of whether the attribute manipulation is successfully applied to the original image. The classification accuracy results are shown in Table 1 below, where higher values indicate that the attribute has been successfully modified in the final image. Prior techniques AttGAN (Attribute Generative Adversarial Network), F-AttGAN (Fashion AttGAN), STGAN (Selective Transfer Generative Adversarial Network), and AMGAN (Attribute Manipulation Generative Adversarial Network) are compared to the techniques of the present disclosure, VPTNet. As shown in Table 1, VPTNet achieves the best performance against the other methods for both sleeve and cloth length attribute manipulation.

TABLE 1

Example Quantitative Results - Attribute Classifier

|  | AttGAN | Fashion-AttGAN | STGAN | AMGAN | VPTNet |
| --- | --- | --- | --- | --- | --- |
| Sleeve | 76.63 | 79.54 | 78.06 | 81.66 | 85.71 |
| Length | 75.05 | 76.74 | 82.41 | 82.05 | 85.90 |
| Average | 75.84 | 78.14 | 80.24 | 81.86 | 85.81 |

User study results also confirm improved results using the techniques of the present disclosure. A user study was conducted to evaluate the attribute editing accuracy and image quality from a human perspective, for both the sleeve and length attribute manipulation tasks. 63 people were involved in the study. Each participant was asked to answer 21 questions, each composed of 2 sub-questions. In each question, participants were given randomly sampled source images and edited results from the test set, for both using the techniques of the present disclosure and the other state-of-the-art approaches. First, participants were asked to identify the image presenting the highest visual quality and preserving the identity and fine details of the source image, regardless of how successful the target attribute manipulation was. Second, participants had to evaluate the image with the most successful attribute edit manipulation. Results are shown in the Table 2, below. As shown in Table 2, the techniques of the present disclosure, VPTNet, achieve the best performance, both from an image quality and attribute manipulation perspective, for both sleeve and cloth length editing tasks. Particularly, these results confirm that VPTNet is superior in altering the target attribute without altering the source image identity and details. Moreover, VPTNet greatly outperforms other methods in the cloth length editing task, which confirms that the approach of the present disclosure can produce convincing results even when the manipulation requires larger shape changes, as opposed to the other methods that often fail in this case.

TABLE 2

Example Quantitative Results - User Study

|  | Attribute Generation | | | Image Quality | | |
| --- | --- | --- | --- | --- | --- | --- |
|  | Sleeve | Length | Average | Sleeve | Length | Average |
| VPTNet | 67.9 | 71.7 | 69.8 | 58.5 | 78.1 | 68.3 |
| AMGAN | 9.2 | 12.4 | 10.8 | 20.5 | 5.2 | 12.9 |
| STGAN | 3.9 | 5.8 | 4.9 | 14.8 | 5.8 | 10.3 |
| F-AttGAN | 14.9 | 7.0 | 11.0 | 4.3 | 7.0 | 5.7 |
| AttGAN | 4.1 | 3.1 | 3.6 | 1.9 | 3.9 | 2.9 |

FIGS. 4-7 illustrate results of the editing techniques of the present disclosure. The following figures present a comparison of four representative attribute manipulation tasks: long to short sleeve (and vice-versa) and long to short cloth length (and vice-versa). These tasks are performed using both the techniques of the present disclosure, VPTNet, as well as several other existing techniques. These qualitative results show drastic improvements using the techniques of the present disclosure.

Figure 4:
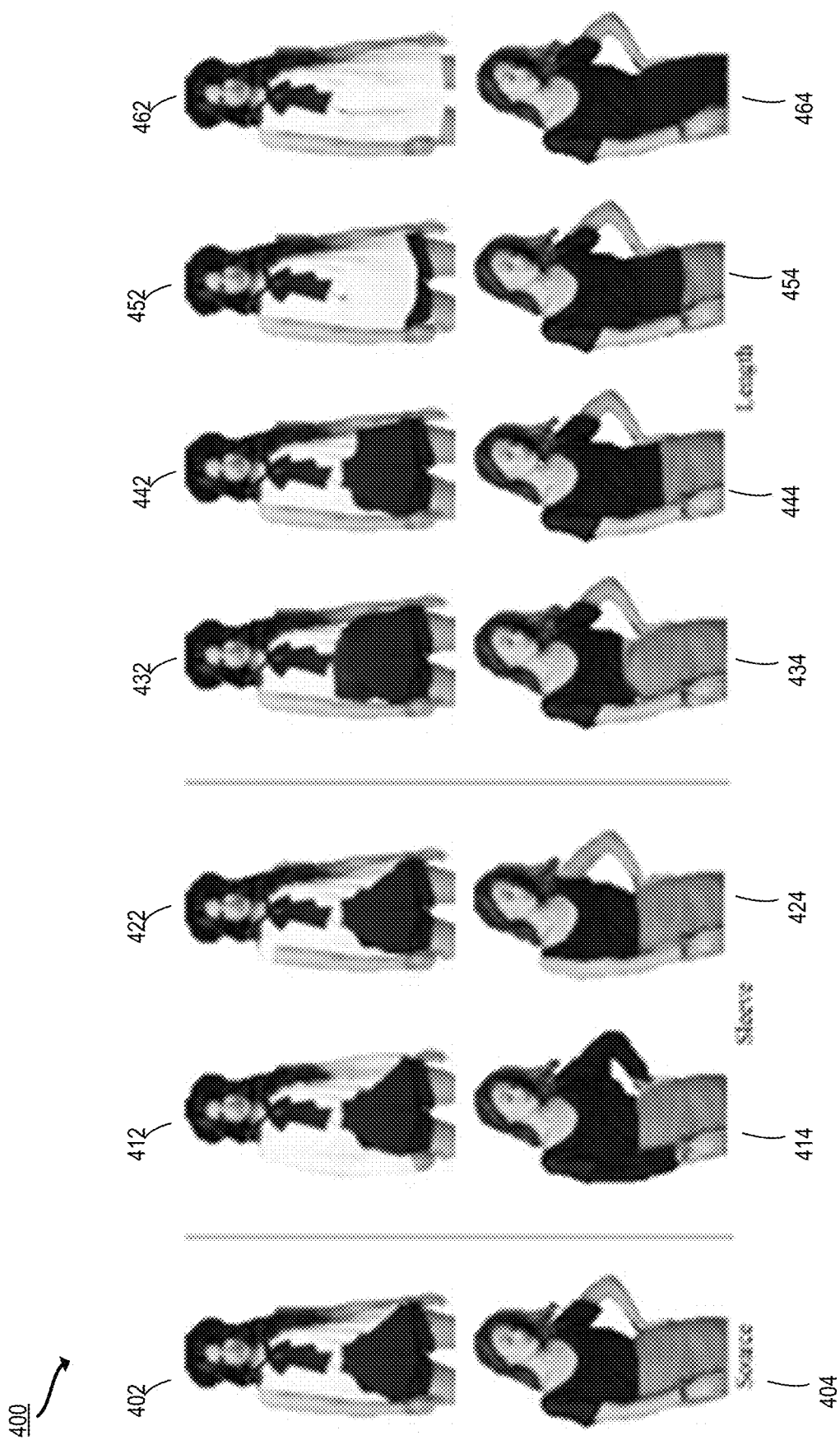
FIG. 4 depicts examples of image editing results according to certain embodiments of the present disclosure.

FIG. 4 shows a series of images 400 illustrating edited images generated using the techniques of FIG. 2, according to some embodiments. The edits are applied to two source images 402 and 404. To illustrate sleeve length editing results, image 402 is edited to make the sleeve length appear longer, in image 412, and shorter, in image 422. Image 404 is edited to make the sleeve length appear longer, in image 414, and longer, in image 424.

To illustrate cloth length editing results, image 402 is edited for various modified shirt lengths. Images 432 and 442 have been edited to shorten the shirt length in source image 402. Images 452 and 462 have been edited to lengthen the shirt length in source image 402. Images 434 and 444 have been edited to shorten the shirt length in source image 404. Images 454 and 464 have been edited to lengthen the shirt length in source image 404. As shown in FIG. 4, the editing techniques of the present disclosure can perform precise attribute manipulation while maintaining the details of the source image.

Figure 5:
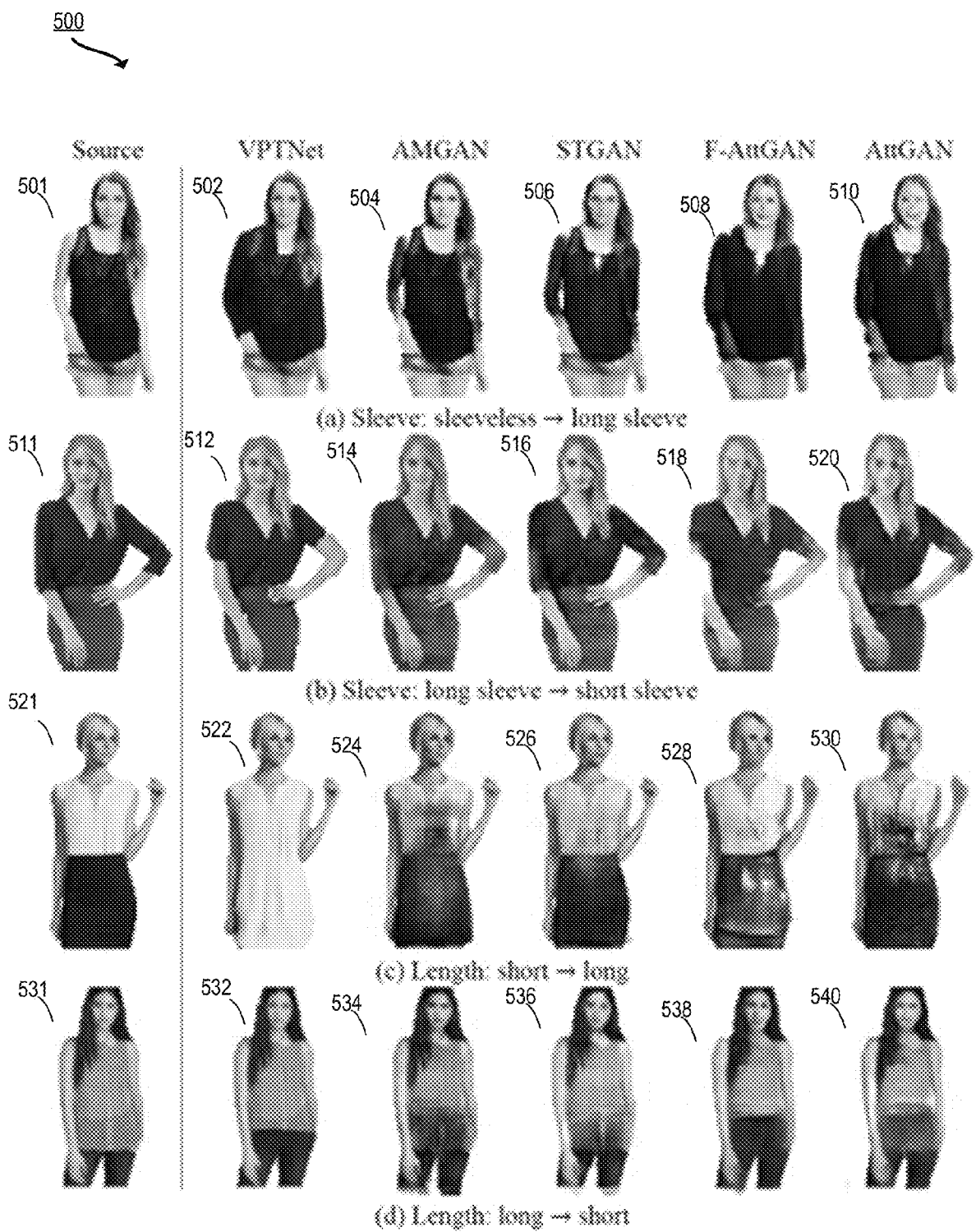
FIG. 5 depicts examples of image editing results comparing techniques according to certain embodiments of the present disclosure with other techniques.

FIG. 5 shows a series of images 500 illustrating edited images generated using the techniques of FIG. 2, in comparison with edits using other methods. As shown in FIG. 5, the edits using the present techniques, VPTNet, result in the best results overall.

For source images 501 and 511, sleeve edits are shown using the present techniques, VPTNet, as well as other techniques, AMGAN, STGAN, F-AttGAN, and AttGAN. Source image 501, including a sleeveless shirt, is edited to have long sleeves, with results shown for VPTNET (image 502), AMGAN (image 504), STGAN (image 506), F-AttGAN (image 508), and AttGAN (image 510). Source image 511, including a long-sleeved shirt, is edited so that the shirt depicted has short sleeves, with results shown for VPTNET (image 512), AMGAN (image 514), STGAN (image 516), F-AttGAN (image 518), and AttGAN (image 520).

In the case of sleeve length editing, which involves relatively small shape changes, some of the other methods seem to provide satisfactory results as to sleeve appearance. However, AMGAN and STGAN generate sleeves with unclear boundaries (hands region) and inconsistencies (shoulders region), while VPTNet is able to generate realistic-looking sleeves. Further, when the human subject presents a highly asymmetric pose, the other benchmarking methods fail to accurately synthesize a realistic image. For example, the faces and arms appear distorted and unrealistic, particularly in images 510, 518, and 520. Moreover, Fashion-AttGAN and AttGAN fail to retain several fine-grained details of the source image (arms, skirt color, face details etc.).

For source images 521 and 531, shirt length edits are shown using the present techniques, VPTNet, as well as other techniques, AMGAN, STGAN, F-AttGAN, and AttGAN. Image 521, including a shirt that is relatively short in length, is edited so that the shirt depicted is longer, with results shown for VPTNET (image 522), AMGAN (image 524), STGAN (image 526), F-AttGAN (image 528), and AttGAN (image 530). Source image 531, including a shirt that is relatively long in length, is edited so that the shirt depicted is shorter, with results shown for VPTNET (image 532), AMGAN (image 534), STGAN (image 536), F-AttGAN (image 538), and AttGAN (image 540).

For the cloth length editing task, all the other methods fail to localize the regions to be edited and show severe artifacts. On the other hand, VPTNet is able to successfully modify the cloth length producing high-quality, realistic results. This confirms that our VPTNet can provide superior results in the shape attribute editing task, even for asymmetric poses and challenging tasks that involve multiple regions to be edited, as in the cloth length manipulation.

Figure 6:
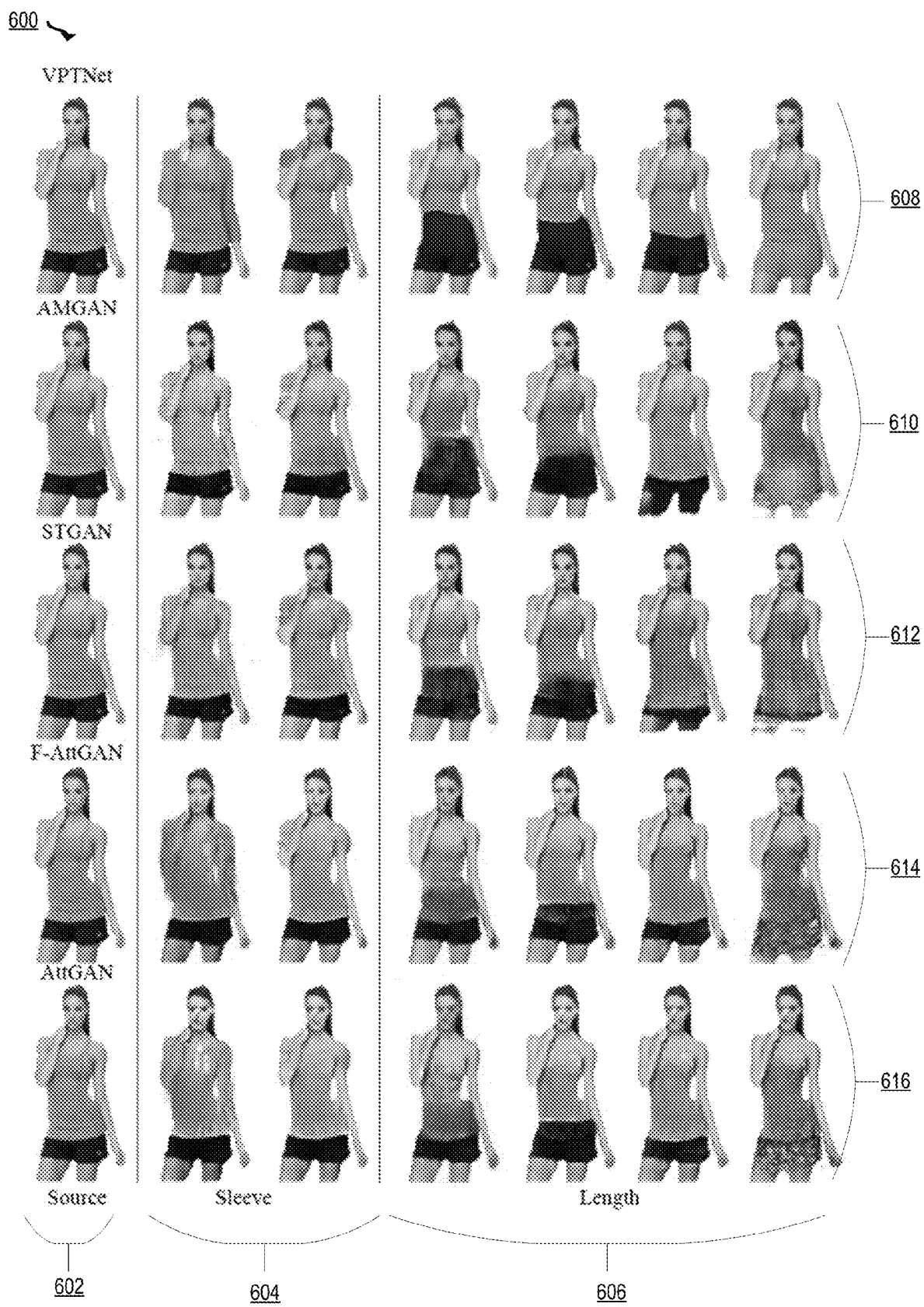
FIG. 6 depicts examples of image editing results comparing techniques according to certain embodiments of the present disclosure with other techniques.

FIG. 6 shows a series of images 600 illustrating edited images generated using the techniques of FIG. 2, in comparison with edits using other methods. As shown in FIG. 6, the edits using the present techniques, VPTNet, result in the best results overall. In FIG. 6, the effectiveness of VPTNet is illustrated for multiple attribute manipulation, on a single source image 602 presenting a challenging asymmetric pose.

In columns 604, the sleeve length is edited, and in columns 606, the shirt length is edited. Row 608 shows results for VPTNet, as described in the present disclosure. Row 610 shows results for AMGAN, row 612 shows results for STGAN, row 614 shows results for F-AttGAN, and row 616 shows results for AttGAN. As shown in FIG. 6, the VPTNet results in row 608 provide a more accurate depiction of both the edited shirt and the rest of the image, whereas the other results shown in rows 610-616 include undesirable artifacts and unrealistic results.

In the sleeve editing task, AMGAN (row 610) and STGAN (row 612) only generate the silhouette or an incomplete sleeve. Also, while editing the cloth length, Fashion-AttGAN (614) and AttGAN (616) alter the neckline region, which should remain unchanged. Moreover, all the benchmarking methods leave visible artifacts of the original cloth. This behavior is due to the difficult nature of the cloth length editing, which involves editing multiple parts at the same time: the upper part of the shirt, the lower part of the shirt, and the legs. On the other hand, using VPTNet of the present disclosure, the target attribute is successfully manipulated in all cases, while maintaining the source image details that should remain unchanged.

Figure 7:
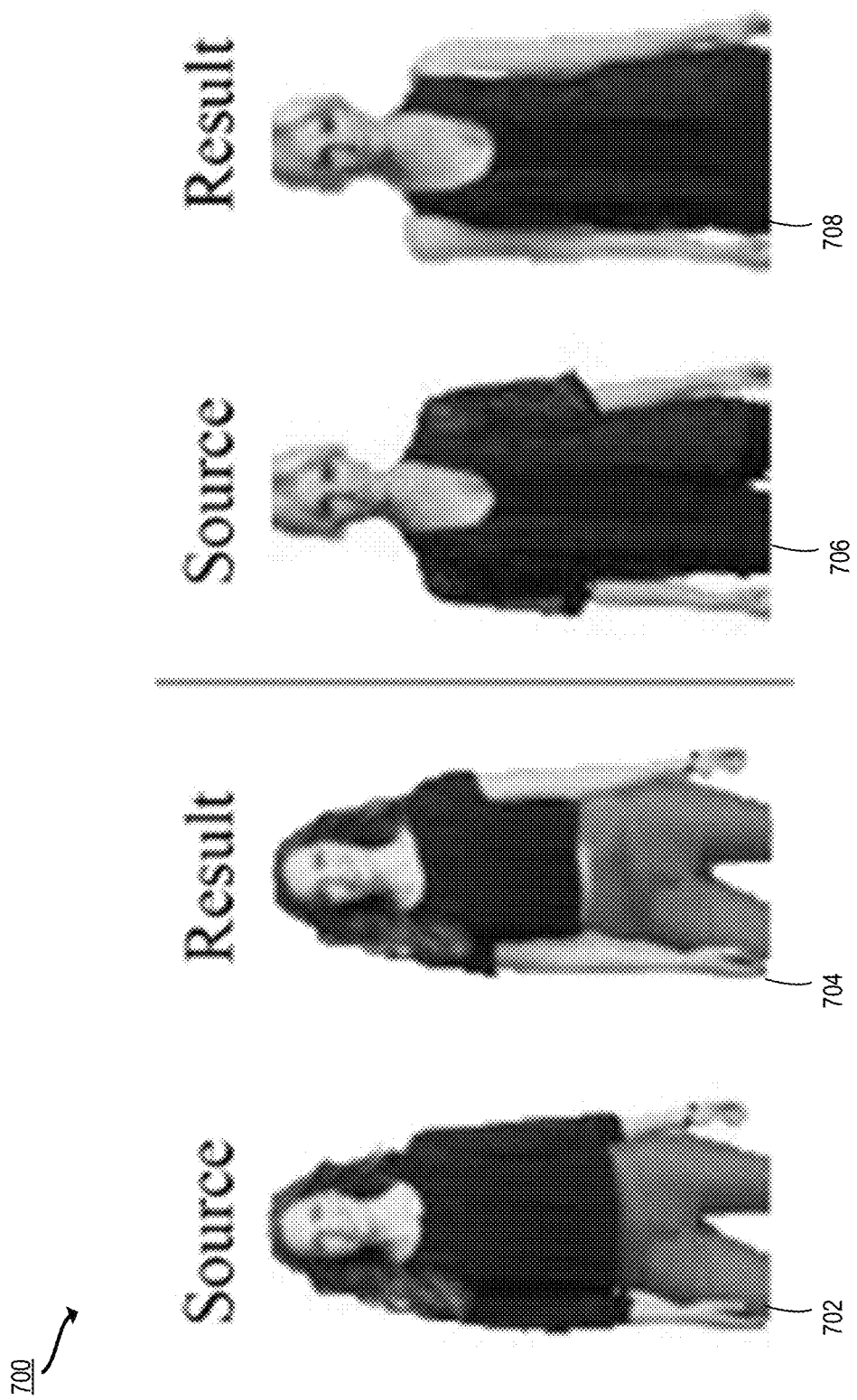
FIG. 7 depicts examples of image editing results according to certain embodiments of the present disclosure.

FIG. 7 shows a series of images 700 illustrating edited images generated using the techniques of FIG. 2, according to some embodiments. In FIG. 7, results are shown for simultaneous multi-attribute editing using VPTNet. In source input image 702, the image includes a long-sleeved shirt of moderate length. VPTNet is used to simultaneously edit the length of the sleeves and shirt, producing edited image 704. Similarly, for source image 706, VPTNet is used to simultaneously edit sleeve length and shirt length to produce edited image 706. Thus, the techniques of the present disclosure can also successfully perform multiple attributes editing operations (such as sleeve and cloth length modifications) at the same time.

Example of a Computing System for Image Attribute Editing

Figure 8:
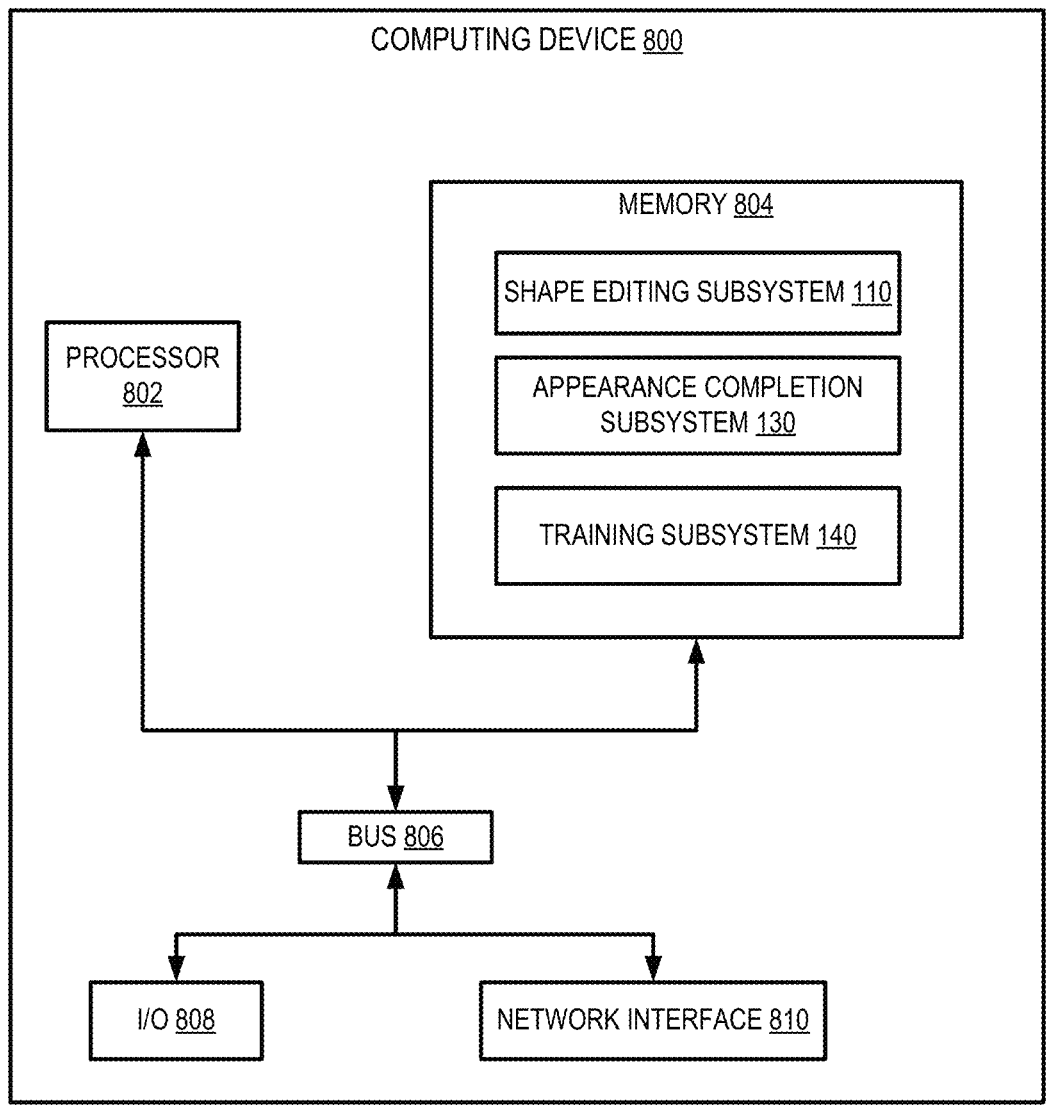
FIG. 8 depicts an example of a computing system that performs certain operations described herein according to certain embodiments of the present disclosure.

Any suitable computing system or group of computing systems can be used for performing the operations described herein. For example, FIG. 8 depicts examples of computing system 800 that executes a shape editing subsystem 110 and appearance completion subsystem 130 for performing image attribute editing as described herein. In some embodiments, the computing system 800 also executes a training subsystem 140 for performing machine learning model training as described herein. In other embodiments, a separate computing system having devices similar to those depicted in FIG. 8 (e.g., a processor, a memory, etc.) executes one or more of the subsystems 110-140.

The depicted examples of a computing system 800 includes a processor 802 communicatively coupled to one or more memory devices 804. The processor 802 executes computer-executable program code stored in a memory device 804, accesses information stored in the memory device 804, or both. Examples of the processor 802 include a microprocessor, an application-specific integrated circuit ("ASIC"), a field-programmable gate array ("FPGA"), or any other suitable processing device. The processor 802 can include any number of processing devices, including a single processing device.

The memory device 804 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 800 may also include a number of external or internal devices, such as input or output devices. For example, the computing system 800 is shown with one or more input/output ("I/O") interfaces 808. An I/O interface 808 can receive input from input devices or provide output to output devices. One or more buses 806 are also included in the computing system 800. The bus 806 communicatively couples one or more components of a respective one of the computing system 800.

The computing system 800 executes program code that configures the processor 802 to perform one or more of the operations described herein. The program code includes, for example, the shape editing subsystem 110, the appearance completion subsystem 130, and the training subsystem 140, or other suitable applications that perform one or more operations described herein. The program code may be resident in the memory device 804 or any suitable computer-readable medium and may be executed by the processor 802 or any other suitable processor. In some embodiments, the shape editing subsystem 110, the appearance completion subsystem 130, and the training subsystem 140 are stored in the memory device 804, as depicted in FIG. 8. In additional or alternative embodiments, one or more of the shape editing subsystem 110, the appearance completion subsystem 130, and the training subsystem 140 are stored in different memory devices of different computing systems. In additional or alternative embodiments, the program code described above is stored in one or more other memory devices accessible via a data network.

The computing system 800 can access data in any suitable manner. In some embodiments, some or all of one or more of these data sets, models, and functions are stored in the memory device 804, as in the example depicted in FIG. 8. For example, a computing system 800 that executes the training subsystem 140 can access training data stored by an external system.

In additional or alternative embodiments, one or more of these data sets, models, and functions are stored in the same memory device (e.g., one of the memory devices 804). For example, a common computing system can host the shape editing subsystem 110, the appearance completion subsystem 130, and the training subsystem 140, as well as the training data. In additional or alternative embodiments, one or more of the programs, data sets, models, and functions described herein are stored in one or more other memory devices accessible via a data network.

The computing system 800 also includes a network interface device 810. The network interface device 810 includes any device or group of devices suitable for establishing a wired or wireless data connection to one or more data networks. Non-limiting examples of the network interface device 810 include an Ethernet network adapter, a modem, and the like. The computing system 800 is able to communicate with one or more other computing devices (e.g., a computing device executing an editor interface 104 as depicted in FIG. 1) via a data network using the network interface device 810.

Figure 9:
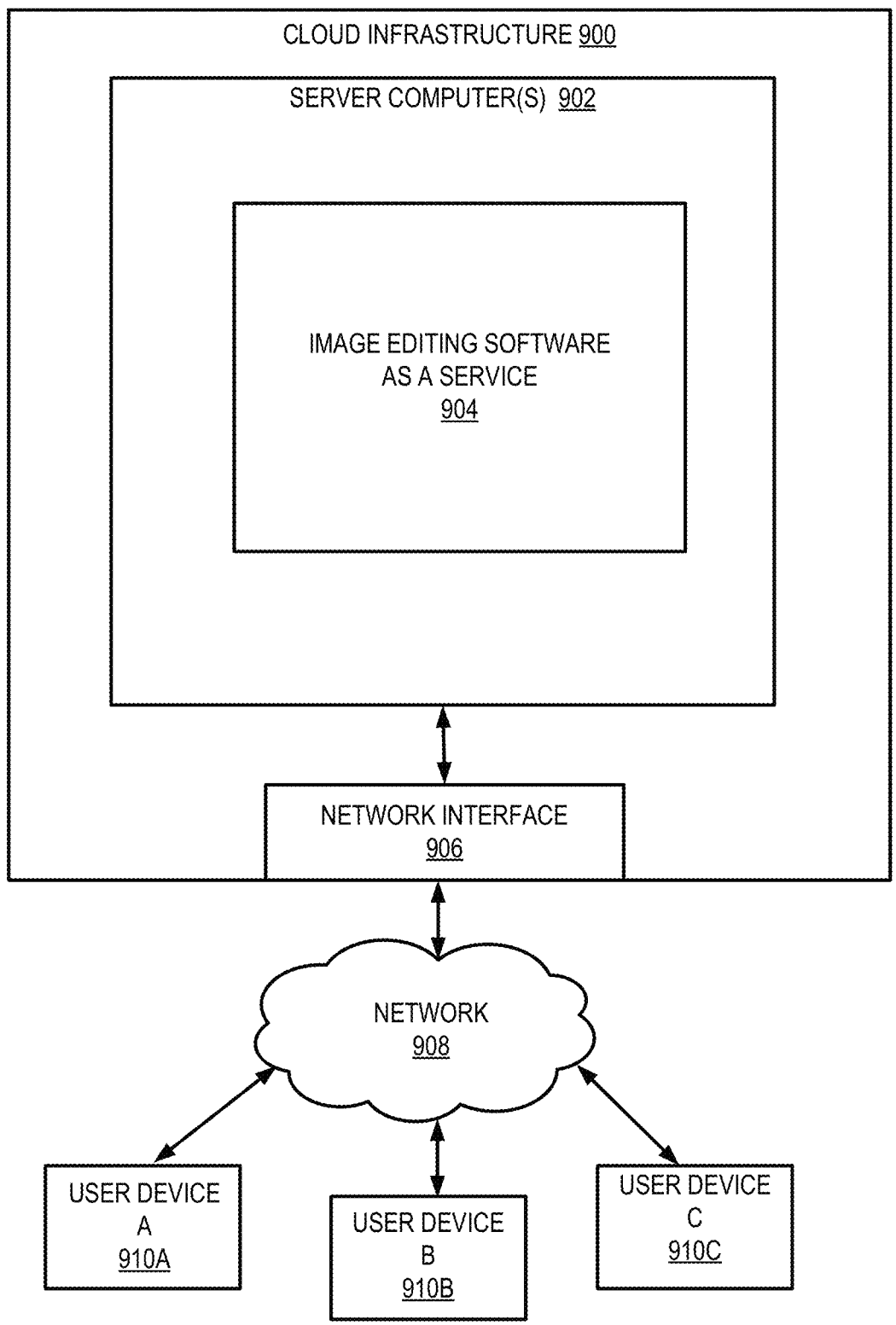
FIG. 9 depicts an example of a cloud computing environment that performs certain operations described herein according to certain embodiments of the present disclosure.

In some embodiments, the functionality provided by the computing device 800 may be offered via a cloud-based service provided by a cloud infrastructure 900 provided by a cloud service provider. For example, FIG. 9 depicts an example of a cloud infrastructure 900 offering one or more services including a service that offers virtual object functionality as described in this disclosure. Such a service can be subscribed to and used by a number of user subscribers using user devices 910A, 910B, and 910C across a network 908. The service may be offered under a Software as a Service (SaaS) model. One or more users may subscribe to such as service.

In the embodiment depicted in FIG. 9, the cloud infrastructure 900 includes one or more server computer(s) 902 that are configured to perform processing for providing one or more services offered by the cloud service provider as image editing software as-a-service. One or more of server computer(s) 902 may implement the shape editing subsystem 110, the appearance completion subsystem 130, and the training subsystem 140, as depicted in FIG. 8. The subsystems 110-140 may be implemented using software only (e.g., code, program, or instructions executable by one or more processors provided by cloud infrastructure 900), in hardware, or combinations thereof. For example, one or more of the server computer(s) 902 may execute software to implement the services and functionalities provided by subsystems 110-140, where the software, when executed by one or more processors of the server computer(s) 902, causes the services and functionalities to be provided.

The code, program, or instructions may be stored on any suitable non-transitory computer-readable medium such as any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computer(s) 902 can include volatile memory, non-volatile memory, or a combination thereof.

In the embodiment depicted in FIG. 9, cloud infrastructure 900 also includes a network interface device 906 that enables communications to and from cloud infrastructure 900. In certain embodiments, the network interface device 906 includes any device or group of devices suitable for establishing a wired or wireless data connection to the network 908. Non-limiting examples of the network interface device 906 include an Ethernet network adapter, a modem, and/or the like. The cloud infrastructure 900 is able to communicate with the user devices 910A, 910B, and 910C via the network 908 using the network interface device 906.

A graphical interface (e.g., editor interface 104 as depicted in FIG. 1) may be displayed on each of the user devices user device A 910A, user device B 910B, and user device C 910C. A user of user device 910A may interact with the displayed graphical interface, for example, to enter an input image and/or image modification parameters. In response, processing for image processing may be performed by the server computer(s) 902.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A computer-implemented method for image editing comprising performing by a computing system:
   receiving an input image comprising a target region and an edit parameter specifying a modification to the target region;
   generating a parsing map of the input image, the parsing map identifying regions in the input image including the target region;
   generating a latent representation of the parsing map by providing the parsing map as input to a first neural network;
   applying an edit to the latent representation of the parsing map based on the edit parameter to generate an edited latent representation of the parsing map;
   providing the edited latent representation of the parsing map as input to a second neural network to generate a modified parsing map, wherein the modified parsing map comprises the target region with a shape change according to the edit parameter;
   based on the input image and the modified parsing map, generating a masked image corresponding to the shape change; and
   based on the masked image, using a third neural network to generate an edited image with the modification to the target region.

2. The method of claim 1, wherein the target region corresponds to a clothing item.

3. The method of claim 1, further comprising:
   providing the masked image as input to a fourth neural network to generate a latent representation of the masked image,
   wherein using the third neural network to generate the edited image comprises providing the latent representation of the masked image as input to the third neural network, wherein the third neural network is trained to fill a masked portion of the masked image.

4. The method of claim 1, further comprising training the second neural network by:
   generating, using the second neural network based upon a training parsing map, a generated parsing map;
   computing a reconstruction loss based upon a pixel regression between the training parsing map and the generated parsing map;
   computing an adversarial loss based upon comparing the training parsing map to the generated parsing map;
   computing an attribute manipulation loss based upon a classified attribute corresponding to the input parsing map; and
   updating the second neural network by minimizing a loss function comprising the reconstruction loss, the adversarial loss, and the attribute manipulation loss.

5. The method of claim 1, wherein:
   the second neural network is a generator neural network; and
   the second neural network is trained using a discriminator neural network, the discriminator neural network comprising a first branch configured to determine whether a training image is computer-generated and a second branch configured to predict an attribute vector specifying attributes of the training image.

6. The method of claim 1, further comprising training the third neural network by:
   generating, using the third neural network based upon an input training image, a generated training image;
   computing a reconstruction loss based upon the input training image and the generated training image;
   computing a mask loss based upon a masked version of the input training image and a masked version of the generated training image;
   computing an attribute manipulation loss based upon a classified attribute corresponding to the input training image; and
   updating the third neural network by minimizing a loss function comprising the reconstruction loss, the mask loss, and the attribute manipulation loss.

7. The method of claim 1, wherein:
   the third neural network comprises a generator neural network comprising a plurality of gated convolutional layers.

8. The method of claim 1, further comprising:
   causing display of a user interface comprising a plurality of interactive components configured to receive user-specified edits;
   receiving input specifying the edit parameter; and
   outputting the edited image to a computing device for display.

9. A computing system comprising:
   a memory;
   a processor;
   a non-transitory computer-readable medium comprising instructions which, when executed by the processor, perform the steps of:
   generating a parsing map of an input image, the parsing map identifying regions in the input image including a target region;
   generating a latent representation of the parsing map by providing the parsing map as input to a first neural network;
   applying an edit to the latent representation of the parsing map based on an edit parameter to generate an edited latent representation of the parsing map;
   providing the edited latent representation of the parsing map as input to a second neural network to generate a modified parsing map, wherein the modified parsing map comprises the target region with a shape change according to the edit parameter;

based on the input image and the modified parsing map, generating a masked image corresponding to the shape change; and based on the masked image, using a third neural network to generate an edited image with modifications to the target region according to the edit parameter.

10. The system of claim 9, the steps further comprising training the second neural network by:

generating, using the second neural network based upon a training parsing map, a generated parsing map;

computing a reconstruction loss based upon a pixel regression between the training parsing map and the generated parsing map;

computing an adversarial loss based upon comparing the training parsing map to the generated parsing map;

computing an attribute manipulation loss based upon based upon a classified attribute corresponding to the training parsing map; and updating the second neural network by minimizing a loss function comprising the reconstruction loss, the adversarial loss, and the attribute manipulation loss.

11. The system of claim 9, wherein:

the second neural network is a generator neural network; and the second neural network is trained using a discriminator neural network, the discriminator neural network comprising a first branch configured to determine whether a training image is computer-generated and a second branch configured to predict an attribute vector specifying attributes of the training image.

12. The system of claim 9, the steps further comprising training the third neural network by:

generating, using the third neural network based upon an input training image, a generated training image;

computing a reconstruction loss based upon the input training image and the generated training image;

computing a mask loss based upon a masked version of the input training image and a masked version of the generated training image;

computing an attribute manipulation loss based upon a classified attribute corresponding to the input training image; and updating the third neural network by minimizing a loss function comprising the reconstruction loss, the mask loss, and the attribute manipulation loss.

13. The system of claim 9, wherein:

the third neural network comprises a generator neural network comprising a plurality of gated convolutional layers.

14. The system of claim 9, the steps further comprising:

causing display of a user interface comprising a plurality of interactive components configured to receive user-specified edits;

receiving input specifying the edit parameter; and outputting the edited image to a computing device for display.

15. A non-transitory computer-readable medium having instructions stored thereon, the instructions executable by a processing device to perform operations comprising:

receiving an input image comprising a target region and an edit parameter specifying a modification to the target region;

generating a parsing map of the input image, the parsing map identifying regions in the input image including the target region;

a step for generating a modified parsing map using one or more trained neural networks, wherein the modified parsing map comprises the target region with a shape change according to the edit parameter; and a step for generating an edited image using one or more additional trained neural networks, wherein the edited image has the modification to the target region.

16. The non-transitory computer-readable medium of claim 15, the one or more trained neural networks used for generating the modified parsing map comprising a generator neural network, the operations further comprising training the generator neural network by:

generating, using the generator neural network based upon a training parsing map, a generated parsing map;

computing a reconstruction loss based upon a pixel regression between the training parsing map and the generated parsing map;

computing an adversarial loss based upon comparing the training parsing map to the generated parsing map;

computing an attribute manipulation loss based upon a classified attribute corresponding to the training parsing map; and updating the generator neural network by minimizing a loss function comprising the reconstruction loss, the adversarial loss, and the attribute manipulation loss.

17. The non-transitory computer-readable medium of claim 16, wherein the generator neural network is trained using a discriminator neural network, the discriminator neural network comprising a first branch configured to determine whether a training image is computer-generated and a second branch configured to predict an attribute vector specifying attributes of the training image.

18. The non-transitory computer-readable medium of claim 15, the one or more additional trained neural networks used for generating the edited image comprising a generator neural network, the operations further comprising training the generator neural network by:

generating, using the generator neural network based upon an input training image, a generated training image;

computing a reconstruction loss based upon the input training image and the generated training image;

computing a mask loss based upon a masked version of the input training image and a masked version of the generated training image;

computing an attribute manipulation loss based upon a classified attribute corresponding to the input training image; and updating the generator neural network by minimizing a loss function comprising the reconstruction loss, the mask loss, and the attribute manipulation loss.

19. The non-transitory computer-readable medium of claim 15, wherein:

the target region corresponds to a clothing item.

20. The non-transitory computer-readable medium of claim 15, the operations further comprising:

causing display of a user interface comprising a plurality of interactive components configured to receive user-specified edits;

receiving input specifying the edit parameter; and outputting the edited image to a computing device for display.

* * * * *